United States Patent
Inoue

[11] Patent Number: 5,224,079
[45] Date of Patent: Jun. 29, 1993

[54] RECORDING APPARATUS FOR MAGNETO-OPTICAL DISC AND DISC CARTRIDGE MISINSERTION PREVENTING MECHANISM

[76] Inventor: Hideki Inoue, c/o Sony Corporation, 7-35, Kitashinagawa 6-chome, Shinagawa-Ku, Tokyo, Japan

[21] Appl. No.: 641,768

[22] Filed: Jan. 16, 1991

[30] Foreign Application Priority Data

Jan. 20, 1990 [JP] Japan .................................. 2-11622

[51] Int. Cl.⁵ ...................... G11B 11/00; G11B 33/02; G11B 5/02
[52] U.S. Cl. .................................... 369/13; 369/77.2; 369/215; 360/59; 360/114
[58] Field of Search .................... 369/75.2, 77.1, 77.2, 369/191, 215, 216, 13; 360/97.01, 99.06, 59, 114, 133

[56] References Cited

U.S. PATENT DOCUMENTS

| | | | |
|---|---|---|---|
| 4,535,374 | 8/1985 | Anderson | 360/97.01 |
| 4,710,831 | 12/1987 | Nishimura | 369/77.2 |
| 4,731,776 | 3/1988 | Ishii | 369/77.2 |
| 4,736,263 | 4/1988 | Takahashi et al. | 360/97 |
| 4,772,965 | 9/1988 | Kato et al. | 360/71 |
| 4,807,068 | 2/1989 | Shiraishi | 369/77.1 |
| 4,833,553 | 5/1989 | Noda | 360/99.06 |
| 4,837,758 | 6/1989 | Motoyama | 369/13 |
| 4,878,139 | 10/1989 | Hasegawa | 360/99.06 |
| 4,884,261 | 11/1989 | Dulziel | 360/97.01 |
| 4,887,174 | 12/1989 | Tezuka | 360/99.06 |
| 4,899,328 | 2/1990 | Ishii et al. | 369/292 |
| 4,989,197 | 1/1991 | Bessho | 369/75.2 |
| 4,993,009 | 2/1991 | Shiho | 360/99.06 |
| 5,020,041 | 5/1991 | Nakao et al. | 369/13 |
| 5,027,334 | 6/1991 | Yamanara et al. | 369/13 |
| 5,068,841 | 11/1991 | Nakayama et al. | 369/13 |
| 5,077,713 | 12/1991 | Takizawa et al. | 369/13 |

FOREIGN PATENT DOCUMENTS

| | | | |
|---|---|---|---|
| 3715602 | 9/1987 | Fed. Rep. of Germany . | |
| 0118901 | 5/1990 | Japan | 360/97.01 |
| 2103863 | 2/1983 | United Kingdom | 369/75.2 |

Primary Examiner—Eugene R. LaRoche
Assistant Examiner—Tan Nguyen

[57] ABSTRACT

A magneto-optical disc recording apparatus for writing information signals on a disc includes an external magnetic field generator that moves in close to the disc after the disc begins to rotate and moves away from the disc before the disc stops rotating to prevent the external magnetic field generator from contacting the disc.

8 Claims, 13 Drawing Sheets

RECORDING APPARATUS FOR MAGNETO-OPTICAL DISC AND DISC CARTRIDGE MISINSERTION PREVENTING MECHANISM

BACKGROUND OF THE INVENTION

1. Field of the Invention

The present invention relates to a magneto-optical disc recording apparatus for recording information signals upon a magneto-optical disc housed in a cartridge, and in particular to a disc cartridge misinsertion preventing mechanism for preventing a disc cartridge from being misinserted into a cartridge holder which forms a disc cartridge loading mechanism for loading the disc cartridge into a disc loading portion provided in a recording apparatus, the apparatus including a mechanism for controlling the movement of an external magnetic field generator toward and away from the disc in association with the commencement and stopping of the rotation of the magneto-optical disc loaded in the disc loading portion.

2. Related Art Statement

Magneto-optical discs including a signal recording layer in which so called perpendicular magnetization is possible have been proposed. In order to record information signals on the magneto-optical disc, an area of the signal recording layer on which information signals are recorded is heated to a temperature not less than Curie temperature by focusing a laser beam on the signal recording layer and the laser beam thereto and an external magnetic field is applied to this area.

Since the signal recording layer which has been heated to a temperature not less than the Curie temperature substantially loses its coercive force, the magnetization direction of the molecules is reversed along the line of the external magnetic field. By reversing the magnetization direction of the signal recording layer in such a manner, recording of digitalized information signals can be performed.

A magneto-optical disc recording apparatus which writes information signals on such a magneto-optical disc, comprises a rotary driving device which holds and rotates the magneto-optical disc, an optical pick-up device for irradiating the signal recording layer of the magneto-optical disc with a laser beam and an external magnetic field generator which applies an external magnetic field upon the signal recording layer.

In the above mentioned magneto-optical disc recording apparatus, some external magnetic field generators include a so-called flying magnetic head. The flying magnetic head is biased in such a direction that it is moved toward a rotating magneto-optical disc. The flying magnetic head comprises a core and a coil which is wound and housed in the core for generating a magnetic field. The core of the flying magnetic head is formed in such manner that the head is moved in close to the magneto-optical disc to form a very small air gap therebetween so that air entrained between the core and the rotating magneto-optical disc forms an air film.

The core of such a flying magnetic head is finished to a smooth planar face on the side of the head facing the magneto-optical disc to form on effective air film because, if the flying magnetic head is brought into contact with the magneto-optical disc while the disc is stationary, there is the possibility that the magneto-optical disc and the flying magnetic head would be damaged.

In the above mentioned disc recording apparatus, some external magnetic field generators are supported by a rotatable arm so that they are movable toward and away from the disc.

In such a magneto-optical disc recording apparatus, it is necessary to rotate the arm over a sufficient angle to separate the external magnetic field generator from the disc by such a distance that loading, unloading and eject operation of the disc may be performed. If the rotating angle of the arm is increased, the apparatus becomes complicated in structure and miniaturization of the apparatus becomes difficult.

If a magneto-optical disc housed in the cartridge is used in the magneto-optical disc recording apparatus in which the external magnetic field generator is supported on the rotatable arm as mentioned above, there is the possibility that the arm will contact the edge of the cartridge when the external magnetic field generator is moved sufficiently close to the disc. If the arm is brought into contact with the edge of the cartridge, the quality of recording of information signals is substantially reduced.

The disc cartridge which houses the magneto-optical disc and is used for this type of magneto-optical disc recording apparatus is formed as shown in FIGS. 1 and 2.

The disc cartridge 101 comprises a square main cartridge body 102 which is formed by abutting upper and lower halves 102a and 102b so that they are engaged with each other and a magneto-optical disc 103 which is rotatably housed in the main cartridge body 102 as shown in FIGS. 1 and 2. A magnetic head opening 104 and an optical head opening 105 extend in a lateral direction through the middle of the upper and lower halves 102a and 102b, respectively, which form a main cartridge body 102 in which the magneto-optical disc 103 is housed and is offset to the front side of the main cartridge body 102. A radial part of the signal recording surface of the magneto-optical disc 103 is exposed to the outside through these openings 104 and 105. A magnetic head for generating an external magnetic field and an optical head are disposed within a recording apparatus for recording desired information signals on the disc 103 and face the disc through these openings. The disc cartridge 101 includes an opening 106 into which rests the disc table of a disc rotating drive apparatus provided within the recording apparatus for rotating the magneto-optical disc 103. The opening 106 is located substantially in the center of the lower half 102b so that the opening 106 is continuous with the optical head opening 105.

A shutter 107 which opens and closes each of the openings 104, 105 and 106 is movably mounted on the main cartridge body 102 so that dust and the like will be prevented from penetrating into the main cartridge body 102 through the magnetic head opening 104, the optical head opening 105 and the disc table opening 106 and from contaminating and damaging the signal recording surface of the optical disc 103 housed in the main cartridge body 102. The shutter 107 is formed by bending a thin metal plate into a U-shaped cross-section and is mounted on the main cartridge body 102 from the front side thereof to cover the opening 104, 105 and 106 with a pair of upper and lower covering plates 107a and 107b, respectively. The shutter 107 is biased by a shutter closing spring (not shown) to close the openings 104, 105 and 106 when the disc cartridge is not loaded on the recording and/or playback apparatus and is not used.

The disc cartridge 101 is provided with the magnetic head opening 104 and the optical head opening 105 which the external magnetic field generating magnetic head and the optical head face, respectively in a position offset toward the front side of the main cartridge body 102 as mentioned above. Accordingly, the direction of loading of the disc cartridge 101 with respect to the cartridge loading portion of the recording and/or playback apparatus is determined in order to align the external magnetic field generating head and the optical head with the magnetic head opening 104 and the optical head opening 105.

The disc cartridge 101 is provided with a notch 109 for determining the direction of insertion into the cartridge holder 121 when the disc cartridge 101 is loaded on the cartridge loading portion by using the cartridge loading apparatus having the cartridge holder 12.1 shown in FIGS. 1 and 2. The notch 109 is formed by truncating a corner of the disc cartridge 101 on one side of the cartridge corresponding to the shutter 107 of the main cartridge body 102. The shape of the substantially square disc cartridge 101 will become asymmetric in lateral and longitudinal directions by providing such a truncated corner 109.

The disc cartridge 101 is formed with a recess 110 to which a cartridge gripping mechanism of the cartridge holder is adapted for automatically loading and unloading the cartridge into the cartridge holder. One of the recesses 110 is formed on each side of the main cartridge body 102 near the shutter 107. The recesses 110 are formed so that they extend through the lower half 102b and through a portion of the upper half 102a and terminate at the upper end in the portion of the upper half 102a.

The cartridge holder 121 of the cartridge loading device for loading the thus formed disc cartridge 101 on the cartridge loading portion is formed as shown in FIG. 1. That is, the cartridge holder 121 comprises a main face 122 which is substantially the same size as that of the face of the optical-disc cartridge 101 and cartridge supports 123, 124 provided on the opposite sides of the main face 122. The cartridge supports 123 and 124 are bent in an L shape in cross-section for holding the opposite sides of the main cartridge body 102. A cartridge holding portion 121a comprises an area surrounded by the main face 122 and the cartridge supporting portions 123 and 124. A shutter opening and closing lever 125 is mounted on the cartridge holder 121. The lever 125 is adapted to move the shutter 7 in a direction represented by an arrow A in FIG. 1 against a biasing force of a shutter closing spring 108 (not shown) for opening each of the openings 104, 105 and 106 formed in the main cartridge body 102 when the disc cartridge 101 is inserted. The shutter opening and closing lever 125 has a shutter opening and closing pin 126 provided at the tip end thereof. The shutter opening and closing pin 126 projects downward from the lever 125 to the inside of the cartridge holder 121 through a rotary guide groove 127 bored in the main face 122 of the cartridge holder 121. The lever 125 is pivotally mounted on a pivot shaft 128 erected from the main face 122 of the cartridge holder 121 at the base end thereof so that the lever is rotatable around the pivot shaft 128. The shutter opening and closing lever 125 is biased by a tension spring 129 tentioned between the lever 125 and a misinsertion detecting lever 130 which will be described hereafter so that it is rotated in a direction B represented by an arrow B in FIG. 1. When the disc cartridge 101 is not inserted, the pin 126 of the shutter opening and closing lever 125 is engaged with a stopper piece 127a formed at one end of a rotary guide groove 127 which will oppose a shutter opening and closing pin engaging recess 111 formed in the disc cartridge 101 for restricting the rotary and biasing position of the lever.

The shutter opening and closing pin engaging recess 111 is formed adjacent the shutter 107 and on the side opposite to the side of the main cartridge body 102 at which the notch 109 is formed.

A misinsertion detecting lever 130 is mounted on the cartridge holder 121 in the vicinity of cartridge support 123 for detecting the misinsertion of the disc cartridge 101 to prevent the cartridge holder 121 from being inserted into the inside of the cartridge holder 121 when the disc cartridge 101 is inserted in a wrong direction. The misinsertion detection lever 130 has a misinsertion detection pin 131 projecting downward at the tip end thereof and is mounted at its based on the main face 122 so that it is pivotable around a pivot shaft 132 erected on the main face 122 of the cartridge holder 121. The misinsertion detection pin 131 projects into the inside of the cartridge holder 121 through a notched hole 133 bored from cartridge support 123 to the main face 122. The misinsertion detection lever 130 is biased to rotate in a direction represented by an arrow c in FIG. 1 by a tension spring 129 tensioned between the lever 130 and the shutter opening and closing lever 125. When the disc cartridge 101 is not inserted, the rotating and biasing position of the misinsertion detecting pin 131 is restricted so that the misinsertion detection pin 131 may be engaged with a notch 109 of the disc cartridge 101 to be inserted into the cartridge holder 121. The rotation of the misinsertion detection pin 131 is limited by the engagement of the misinsertion detection pin 131 with the edge of the side of the main face 122 in the notch 133.

The disc cartridge 101 is inserted into the thus formed cartridge holder 121 through the insertion opening at the front side of the cartridge holder 121 while the upper side of the opening 104 for the magnetic head faces the main face 122 of the cartridge holder 121. The front side of the cartridge holder 121 on which the shutter 107 is mounted is a leading end for insertion and the opposite sides of the main cartridge body 102 are engaged with and supported by respective cartridge supports 123 and 124 as shown in FIG. 1. When the disc cartridge 101 is inserted into the cartridge holder 121 properly as shown in FIG. 1, the misinsertion detection pin 131 is brought into an engagement with the notch 109 of the disc cartridge 101. When the disc cartridge 101 is further inserted into the cartridge holder 121 from this position, the misinsertion detection lever 130 having the misinsertion detection pin 131 engaged with the notch 109 is rotated in a direction opposite arrow C in FIG. 1, against the biasing force of the tension spring 129 while the misinsertion detection pin 131 slides along the notch 109 so that the misinsertion detection pin will move to the side of the main cartridge body 102 for enabling the disc cartridge 101 to be inserted to a proper loading position in the cartridge holder 121.

When the disc cartridge 101 is inserted into the inside of the cartridge holder 121 to rotate the misinsertion detection lever 130 as mentioned above, the shutter open and closing pin 126 will be in engagement with the shutter opening and closing pin engagement recess 111 of the disc cartridge 101. When the disc cartridge is further inserted into the cartridge holder 121, the shutter opening and closing lever 125 is rotated in a direction opposite arrow B in FIG. 1 against a biasing force of the tension spring 129 since the shutter opening and closing pin 126 is urged by the disc cartridge 101. The shutter 107 of the disc cartridge 101 is opened by the shutter opening and closing pin 126 against a biasing force of the shutter closing spring 108 (not shown) to move in a direction of arrow A in FIG. 1 for opening each of the openings 104, 105 and 106. When the disc cartridge 101 has been inserted in a predetermined position into the cartridge holder 121, each of the openings 104, 105 and 106 is completely opened.

If the disc cartridge 101 is misinserted from the rear side with respect to the shutter 107, the misinsertion detection pin 131 would abut on and be engaged with the rear side of the disc cartridge since the cartridge 101 is not formed on the rear side thereof with any notch which has been mentioned above. The misinsertion detection lever 130 cannot be rotated, thus preventing the disc cartridge 101 from being inserted into the cartridge holder 121. That is, the misinsertion detection lever 130 prohibits the disc cartridge 101 from being inserted into the cartridge holder 121 unless a notch is formed on the leading corner of the disc.

Some of the disc cartridges housing a disc recording medium are very analogous in shape. For example, a magnetic disc cartridge housing a magnetic disc which is 3.5 inches in diameter is analogous to the disc cartridge 101 housing the above mentioned disc 103. The magnetic disc cartridge 201 is identical to the cartridge 101 in size and structure except that the thickness $D_1$ of the above mentioned disc cartridge 101 is greater than the thickness $D_2$ of the magnetic disc cartridge 201. The cartridge 201 is formed as shown in FIGS. 3 and 4. That is, the magnetic disc cartridge 201 comprises upper and lower square halves 202a and 202b which are abutted on and engaged with each other and a magnetic disc 203 rotatably housed therebetween as is similar to the disc cartridge 101. The upper and lower halves 202a and 202b which form the housing body 202 housing the magnetic disc 203 are provided with openings 204 and 205 extending in a lateral direction through the center of the housing and is offset to the front side of the cartridge. A part of the signal recording surface of the magnetic disc 203 is exposed through openings 204 and 205.

A shutter 207 having a U-shaped cross section which opens and closes the openings 204 and 205 is mounted on the cartridge 201 so that it adapted thereto. Thus shutter 207 is biased by a shutter closing spring (not shown) so that the shutter 207 will close the openings 204 and 205 when the magnetic disc cartridge 201 is not loaded on the recording and/or playback apparatus and is not used.

The openings 204 and 205 of the magnetic disc cartridge 201 are also provided in a position offset to the front side of the cartridge 201 through which the signal recording surface of the magnetic disc 203 is exposed as is similar to the disc cartridge 101. In order that the magnetic an optical heads of the recording and/or playback apparatus which move through respective openings 204 and 205 into the cartridge 202 correspond to respective openings 204 and 205, the loading direction of the magnetic disc cartridge 201 on a cartridge portion of the recording and/or playback apparatus must be predetermined. The magnetic disc cartridge 201 is also provided with a notch 209 for determining the direction of insertion of the cartridge into the cartridge holder when the disc cartridge 201 is loaded on the cartridge loading portion of the recording and/or playback apparatus by using a cartridge loading device with the cartridge holder.

Furthermore, the magnetic disc cartridge 201 is also provided with a recess 210 which is to be engaged with the cartridge gripping mechanism of the cartridge holder so that loading and unloading operation of the cartridge on and from the cartridge loading portion of the recording and/or playback apparatus can be automatically performed by the cartridge holder similarly to the disc cartridge 101.

The magnetic disc cartridge 201 is formed substantially identically with the disc cartridge 101 in size on plan and in the notch 209 for misinsertion prevention. Therefore, there is the possibility that the magnetic disc cartridge 201 would be accidentally inserted into the cartridge holder 121 for the disc cartridge 201.

If the magnetic disc cartridge 201 is accidentally inserted into the cartridge holder 121, misinsertion detection pin 131 is urged to the side edge of the magnetic disc cartridge 201 by the notch 209 of the magnetic disc cartridge 201 as shown in FIG. 5 so that the misinsertion detection lever 130 is moved against a biasing force of a tension spring 129 for enabling the magnetic disc cartridge 201 to be inserted.

However, if the magnetic disc cartridge 201 is inserted into the cartridge holder 121 while the notch 209 corresponds to the misinsertion detection lever 130, the lower half 202b would face the main face 122 of the cartridge holder 121 and the edge 210a of the recess 210 would face the misinsertion detection pin 131. Since the misinsertion detection pin 131 comprises a metal pin having a small diameter which extends from the tip end of the misinsertion detection lever 130 and is formed shorter in length than the height ($H_1$) of the cartridge holder 121, the misinsertion detection pin 131 would be engaged with the recess 210 as shown in FIGS. 5 and 6 to lock the cartridge in place if the cartridge is inserted into the magnetic disc cartridge 201. Once the misinsertion detection pin 131 is engaged with the recess 210, it is difficult to remove the magnetic disc cartridge 201 from the disc holder 121 or further insert the cartridge 201 into the disc holder 121. As a result of this, the magnetic cartridge 201 and the cartridge holder 121 may be damaged.

OBJECT AND SUMMARY OF THE INVENTION

It is an object of the present invention to provide a recording apparatus for a magneto-optical disc in which the external magnetic field generator will not make contact with the magneto-optical disc even if a flying magnetic head is used as an external magnetic field generator.

It is also an object of the present invention to provide a recording apparatus for a magneto-optical disc in which an external magnetic field generator is sufficiently separated from a magneto-optical disc without increasing the rotary angle of the arm on unloading and eject operation of the magneto-optical disc.

It is also an object of the present invention to provide a recording apparatus for a magneto-optical disc in which an external magnetic field generator can be moved in sufficiently close to the magneto-optical disc without contact between the arm and the edge of the cartridge even if the external magnetic field generator is supported on a rotatable arm and the magneto-optical disc is housed and used in the cartridge.

It is a further object of the present invention to provide a disc cartridge misinsertion prevention mechanism which enables only specified disc cartridges to be inserted and positively prevents improper disc cartridges from being inserted even though the cartridges are formed having analogous shapes.

A recording apparatus for a magneto-optical disc in accordance of the present invention comprises a cartridge holder which is moved toward and away from a chassis; a lifter which is moved to follow said cartridge holder; an external magnetic field generator which is supported so that it is movable toward and away from the chassis and is supported in a position separated from a magneto-optical disc of the disc cartridge loaded on the cartridge holder by said lifter; and control means which moves the external magnetic field generator via the lifter after commencement of the rotation of the magneto-optical disc so that the generator approaches the magneto-optical disc and which moves the external magnetic field generator via the lifter before stopping of the rotation of said magneto-optical disc so that the generator is moved away from said magneto-optical disc.

A recording apparatus for a magneto-optical disc in accordance with the present invention comprises an external magnetic field generator which is supported by a rotatable arm so that the generator is movable toward and away from a magneto-optical disc and which is movable together with the arm in a radial direction of the disc, the external magnetic field generator being moved in a radial direction away from the disc when the disc is unloaded.

In the recording apparatus of a disc in accordance with the present invention the external magnetic field generator is mounted on a projection provided on one side of a rotatable arm facing the disc.

Since the external magnetic field generator is moved via the lifter by control means in a disc recording apparatus of the present invention in such a direction that it approaches the disc after the commencement of the rotation of the disc and is moved away from the disc before stopping of the rotation of the disc, the external magnetic field generator will not be in contact with the disc when the disc is not rotating.

The external magnetic field generator is supported on the rotatable arm so that it can be moved toward and away from the magneto-optical disc and is movable in a radial direction relative to the disc together with the arm. The external magnetic field generator is moved in a radial direction away from the disc when the disc is unloaded. Therefore, the external magnetic field generator is located in the outer peripheral side of the disc when the disc is ejected for discharge.

Further when the external magnetic field generator is mounted on a projection of the rotatable arm on the side facing the disc in the above mentioned disc recording apparatus, the arm is separated from the disc cartridge even when the external magnetic field generator makes contact with the disc.

A disc cartridge misinsertion preventing mechanism in accordance with the present invention comprises a cartridge holder into which the disc cartridge having a notch for determining an insertion direction formed at a corner on one side thereof is inserted and held therein; and misinsertion detection means having a misinsertion detection portion which is urged by the disc cartridge to move in an outer direction relative to a cartridge holding portion of a cartridge holder when the disc cartridge is inserted into the cartridge holder and which is engaged with the disc cartridge for preventing the disc cartridge from being inserted into the cartridge holder when the disc cartridge is misinserted. The misinsertion detection portion of the misinsertion detection means has a width larger than the width of a recess provided on the side of the disc cartridge on which a notch is formed.

The misinsertion detection portion of the disc cartridge misinsertion preventing means is prevented from being engaged with the recess since it is wider than the width of the recess formed on the side at which the notch for determining the direction of the insertion of the disc cartridge into the cartridge holder is formed.

DETAILED DESCRIPTION OF THE EMBODIMENTS

Detailed embodiments of the present invention will be hereafter described with reference to the drawings.

Figure 7:
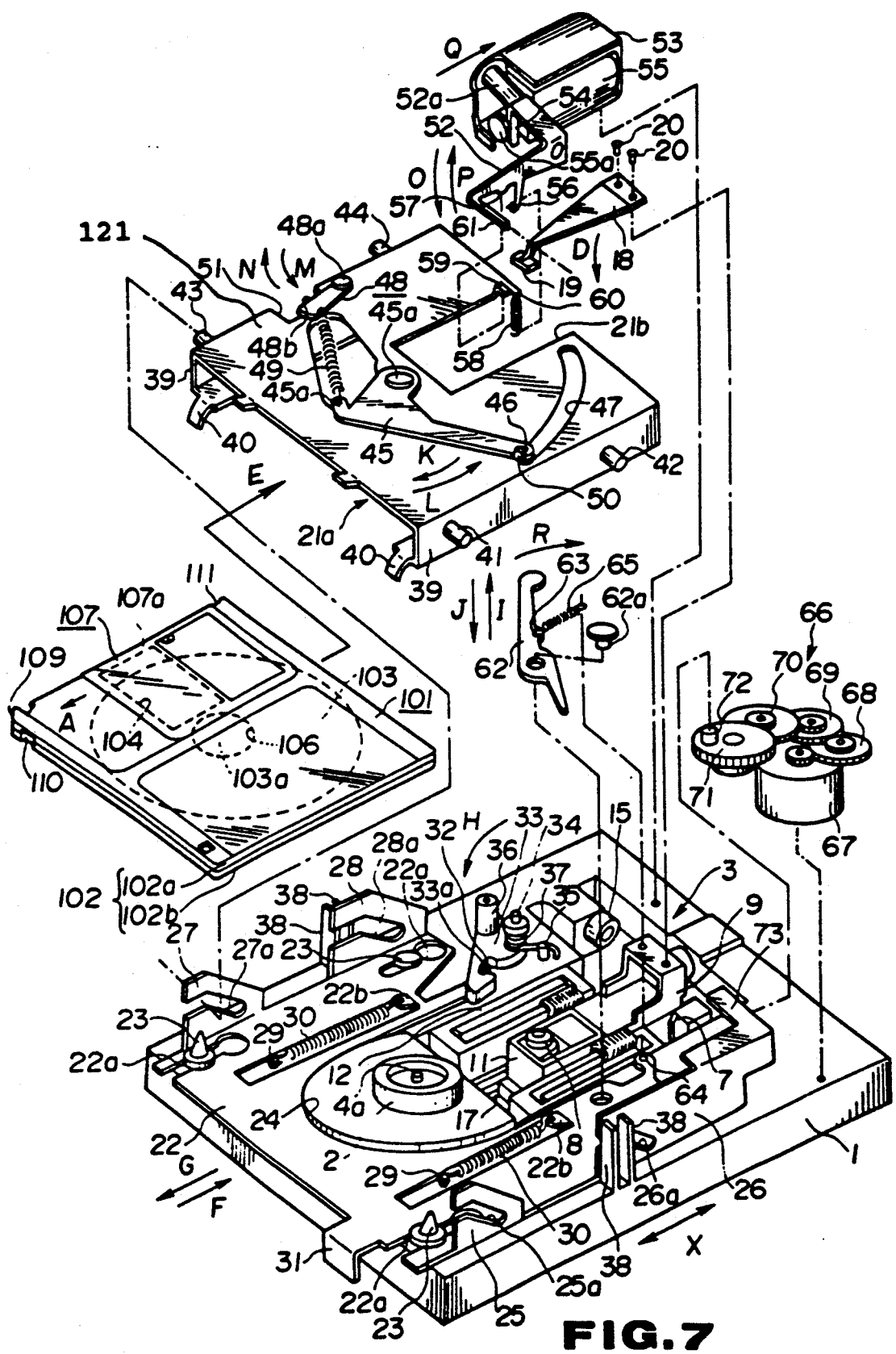
FIG. 7 is an exploded perspective view showing the structure of a magneto-optical disc recording apparatus of the present invention.

A magneto-optical disc recording apparatus of the present invention has a disc cartridge 101 mounted thereto which houses an magneto-optical disc 103 as shown in FIG. 7 and is formed so that it is capable of recording information signals on the magneto-optical disc 103.

The magneto-optical disc 103 has a signal recording layer in which so called "perpendicular magnetization" can be carried out. The magneto-optical disc 103 is formed so that the magnetization direction of the signal recording layer is reversed for writing information signals thereon by heating the signal recording layer to a temperature not less than the so called Curie temperature by irradiation with a laser beam or the like in the presence of an external magnetic field on the heated area of the layer. A disc like chucking hub 103a formed of a metal or the like is firmly secured to the center of the magneto-optical disc 103.

The magneto-optical disc recording apparatus of the present invention comprises a chassis 1 as shown in FIG. 7 and has a disc table 2 and an optical pick-up device 3 on the chassis 1.

Figure 12:
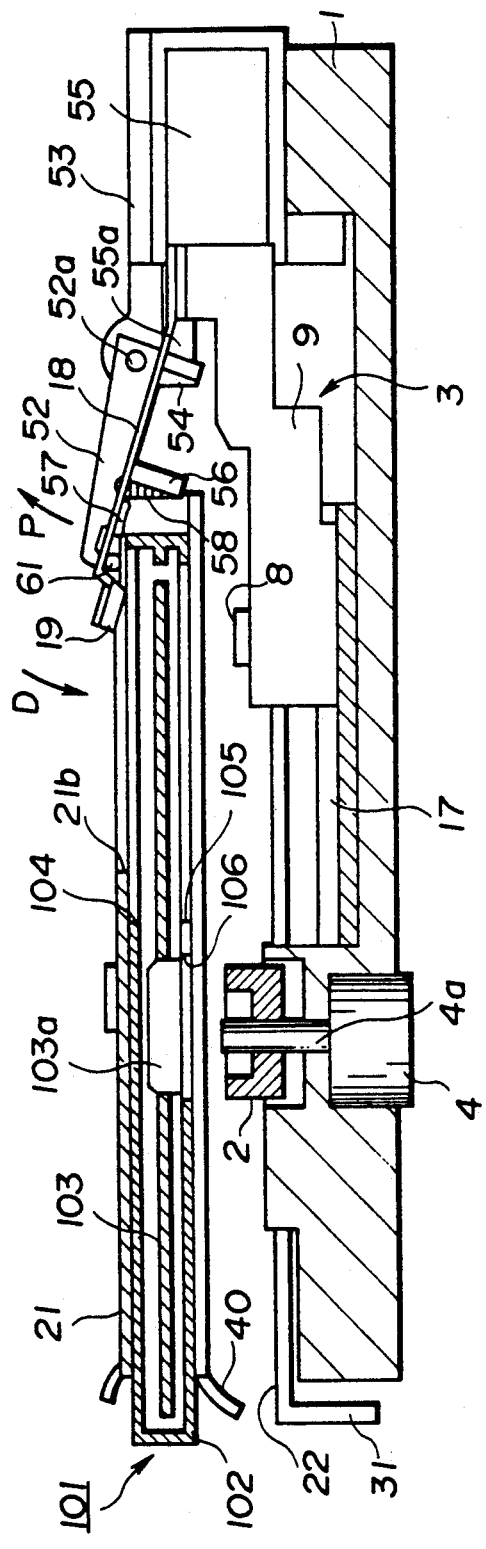
FIG. 12 is an enlarged longitudinal sectional view showing the structure of the disc recording apparatus of the present invention.

The disc table 2 is substantially disc shaped as shown in FIG. 12 and is mounted on a driving shaft 4a of a spindle motor 4 mounted on the chassis 1 so that the disc table 2 is supported in a parallel relationship with the chassis 1. The disc table 2 has magnetic properties so that it attracts the chucking hub 103a provided in the center of the above mentioned magneto-optical disc 103. That is, the magneto-optical disc 103 is operated to rotate together with this disc table 2 when the spindle motor 4 is activated.

Figure 15:
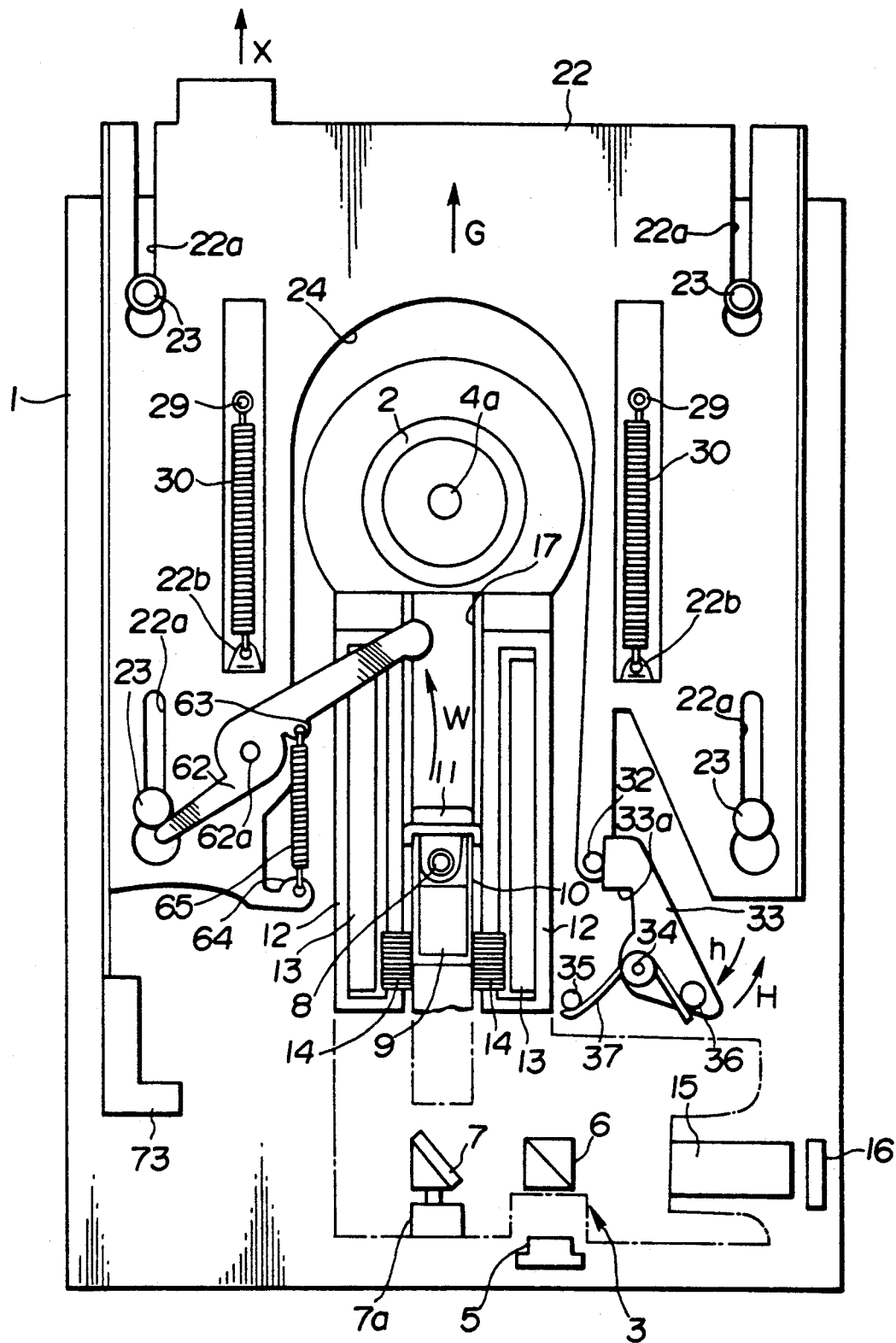
FIG. 15 is an enlarged plan view showing the structure of the chassis and optional pick-up device of the disc recording apparatus of the present invention.

The optical pick-up device 3 comprises a semiconductor laser 5 which is mounted on the chassis 1 as shown in FIG. 15 and serves as a light source. The optical pick-up device 3 is formed so that the laser beam emitted from the semiconductor laser 5 and incident upon and reflected by the magneto-optical disc 103 is detected by an optical detector 16 mounted on the chassis 1.

That is, the laser beam emitted from the semiconductor laser 5 is transmitted through a collimator lens (not shown) and then through a beam splitter 6 and a galvanic mirror 7 which are mounted on the chassis 1 and is reflected by a reflection mirror (not shown) and is then incident upon an objective lens 8. The galvanic mirror 7 is an optical device for achieving a so called tracking servo operation and is supported on a driving portion 7a and is operated to rock for deflecting the laser beam in such a direction that the beam will contact it and be separated from the chassis 1.

The objective lens 8 is mounted on a lens bobbin 11 supported on a movable block 9 via a support arm 10. The movable block 9 is movably supported by a support rail 17 provided on the chassis 1. The thus supported objective lens 8 faces the signal recording surface of the magneto-optical disc 103 of the disc cartridge 101 which is loaded on the magneto-optical disc recording apparatus as will be described hereafter and is movable toward and away from the magneto-optical disc 103. The objective lens 8 is movable toward and away from the magneto-optical disc 103 by displacement of the support arm 10 for achieving so called focus servo operation. The objective lens 8 is moved by an objective lens driving mechanism (not shown) in such an axial direction that it is moved toward and away from the disc 103. The movable block 9 is moved along the support rail 17 in a radial direction of the disc 103 represented by an arrow X in FIG. 7 by a magnetic circuit comprising pairs of magnetic yokes 12, 12 and magnets 13, 13 which are provided on the chassis 1 and a pair of movable coils 14, 14 mounted on the movable block 9.

The laser beam incident on the objective lens 8 is converged upon the magneto-optical disc 103 and is reflected by the magneto-optical disc 103 and is returned to the objective lens 8 again. The laser beam which has been returned to the objective lens 8 is passed through the reflection mirror and the galvanic mirror 7 and then transmitted through the beam splitter 6 and is incident upon an optical detector system provided on the chassis 1. The optical detector system 15 comprises a Wollaston Prism and a condenser lens and the like and is adapted to deflect the laser beam incident upon the optical detector system 15 depending upon the polarization direction for converging the beam upon the optical detector 16.

As shown in FIG. 7, a flying magnetic head 19 serving as an external magnetic field generator is mounted on the movable block 9 via the support arm 18 so that it is opposite to the objective lens 8.

Figure 17:
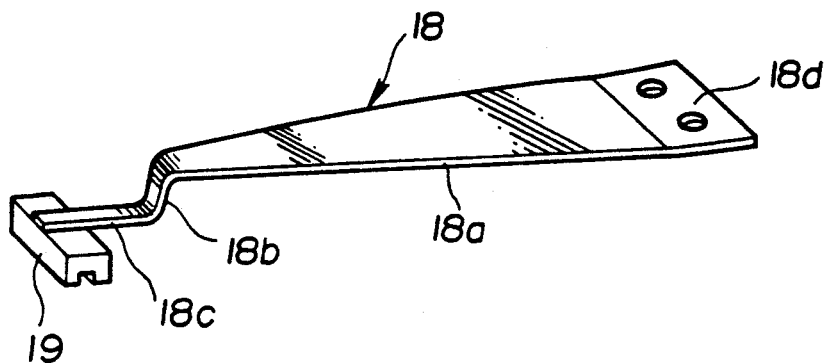
FIG. 17 is an enlarged perspective view showing the structure of a flying magnetic head and a support arm which form the disc recording apparatus of the present invention.

The support arm 18 is made of a thin metal sheet or the like so that it is flexible, as shown in FIG. 17. The support arm 18 comprises a flexer portion 18a and a gimbal portion 18b which is formed on the tip of the arm 18 via a projection 18c formed integrally with the tip of the flexer portion 18a. The support arm 18 is supported on the movable block 9 by a support portion 18d provided at a base end which is mounted on the movable block 9 by setscrews.

The flying magnetic head 19 comprises a core which is formed into a substantially square shape and a coil wound in the core for generating a magnetic field. When the disc main cartridge body 102 is loaded in the recording apparatus, the flying magnetic head 19 faces the objective lens 8, with the magneto-optical disc 103 resting therebetween. The magnetic head 19 is biased to move toward the magneto-optical disc 103 as shown by an arrow D in FIG. 7 by the spring force of the flexer portion 18a and the gimbal portion 18c as will be described hereafter. The core of the flying magnetic head 19 is held in such a condition that it is close to the magneto-optical disc 103 to form a very small space therebetween by the action of air entrained between the magneto-optical disc 103 and the flying magnetic head 19 when the magneto-optical disc 103 is rotated.

The disc recording apparatus comprises a disc cartridge loading mechanism formed on the chassis 1, as shown in FIG. 7. The disc cartridge loading mechanism loads the disc cartridge 101 into a position where recording of information signal is performed by the disc recording apparatus. The disc cartridge loading mechanism comprises a cartridge holder 121 into which the disc cartridge 101 is inserted from the front side thereof and holds the inserted disc cartridge 101 and an eject plate 22 which is slidably supported on the chassis 1 for moving the cartridge holder 121 to and from the chassis 1.

The eject plate 22 is provided with four guide slits 22a, one pair for each side of the plate 22. Four positioning pins 23 erecting on the chassis 1 are inserted through the guide slits 22a so that the eject plate 22 is slidable on the chassis 1 in forward and rearward directions represented by arrows G and F in FIG. 7, respectively. Each of the positioning pins 23 is adapted to abut on the disc cartridge 101 for positioning the disc cartridge 101 when the disc cartridge 101 is loaded on the disc recording apparatus.

The eject plate 22 is formed in the center of the chassis 1 with a notch recess 24 which opens at the rear side of the plate so that the disc table 2 and the optical pick-up device 3 are exposed on the upper side thereof. Two pairs of cam plates 25 and 26, 27 and 28 for moving the cartridge holder 121 to and from the chassis 1 are formed on the respective side of the eject plate 22 so that the cam plates extend from the eject plate. The cam plates 25 through 27 are provided with inclined cam faces 25a, 26a, 27a, 28a, respectively which are inclined toward the rear side of the chassis 1.

The eject plate 22 is biased in the forward direction represented by an arrow G in FIG. 7 by a pair of tension springs 30, 30 provided between a pair of projections 22b, 22b and a pair of engagement pins 29, 29 provided on the chassis 1. The eject plate 22 has a bent extension on the front side thereof to form a manipulation button mount 31 on which an eject manipulation button can be mounted.

The eject plate 22 is provided with a lock pin 32 on the upper face of the rear side thereof so that the pin is projected upward therefrom. When the eject plate 22 is in the eject position located at the rear side, as indicated by the arrow F in FIG. 7, the lock pin 32 is engaged with a lock lever 33 rotatably supported on the chassis 1 for locking the eject plate 22 in the eject position. The lock lever 33 is rotatably supported on a support shaft 34 erected on the chassis 1. The lock lever 33 is biased to rotate in such a direction by a torsional coil spring 37 that operates on an engagement portion 33a of the lever 33 which is formed into a hook shape at the tip thereof for engaging with lock pin 32 as shown by arrow H in FIG. 7. The torsional coil spring 37 is wound around the support shaft 34 and has one arm portion engaged with an engagement pin 35 erected on the chassis 1 and the other arm engaged with a rotating pin 36 projected on the midportion of the lock lever 33. The rotating pin 36 is biased by the disc cartridge 101 which is inserted into the cartridge holder 121. The lock lever 33 is adapted to lock the eject plate 22 in the eject position and biases the disc cartridge 101 inserted into the cartridge holder 121 via the rotating pin 36 forward as shown by an arrow G in FIG. 7.

A pair of opposing guide pieces 38, 38 are projected from the eject plate 22 on each side of the eject plate 22.

The cartridge holder 121 is disposed on the eject plate 22. The cartridge holder 121 is formed into a flat plate which is substantially the same size as the disc cartridge 101. The cartridge holder 12 is bent at opposite sides thereof to form a pair of slide guide walls 39, 39 having a L-shaped cross-section, which are opposite with each other. Reception area 21a for receiving and holding the disc cartridge 101 is formed between the opposite slide guide walls 39, 39. The cartridge holder 121 is formed with inclined guide faces 40, 40 at the front end thereof so that the disc cartridge 101 is easily inserted to the holder 121 in an insertion direction represented by an arrow E in FIG. 7. When the disc cartridge 101 is inserted into the reception area 21a, the disc cartridge 101 is held in such a condition that the cartridge 101 faces the chassis 1 over an entire area thereof on the side of the chassis 1.

Two pairs of guide pins 41 and 42, and 43 and 44 are projected from the respective outer side of the cartridge holder 121. The guide pins 41, 42, 43 and 44 are provided so that they correspond to the cam plates 25, 26, 27 and 28 of the eject plate 22, respectively. The cartridge holder 121 is disposed on the eject plate 22 while the rear side guide pins 42 and 44 are inserted between the guide piece 38 and 38 and the guide pins 41, 42, 43 and 44 rest on the inclined cam faces 25a, 26a, 27a and 28a, respectively. Accordingly, the cartridge holder 121 may be moved toward and away from the chassis in directions represented by arrows I and J in FIG. 7 when the eject plate is moved in forward and rearward directions represented by arrows G and F in FIG. 7.

A shutter opening and closing lever 45 which is formed into a substantial L-shape is mounted on the upper surface of the cartridge holder 121 so that the lever 45 is rotatable along the upper surface of the cartridge holder 121. The shutter opening and closing lever 45 is rotatably supported on a support shaft 45a which is mounted on the cartridge holder 121 at the base end thereof. The lever 45 has a shutter opening pin 46 mounted on the tip end thereof. The pin 46 projects from the lever 45 through a slit 47 formed on the upper side of the cartridge holder 121 toward the chassis 1 and into the reception area 21a of the cartridge holder 121.

The shutter opening and closing lever 45 is biased by a second tension spring 49 tensioned between a projection 45a provided on the shutter opening and closing lever 45 and is mounted on the upper surface of the cartridge holder 121 for rotating in a direction represented by an arrow K in FIG. 7 so that the shutter opening pin 46 is moved toward the front end of the cartridge holder 121. A misinsertion detecting lever 48 is also mounted on the upper surface of the cartridge holder. The shutter opening and closing lever 45 is positioned by abutting at the tip end thereof on the stop piece 50 projecting upward from the cartridge holder 121 by the biasing force of the second tension spring 49. The shutter opening pin 46 of the thus positioned shutter opening and closing lever 45 rests within shutter opening and closing pin engaging recess 111 of the disc cartridge 101 which is inserted into the reception area 21a.

Figure 8:
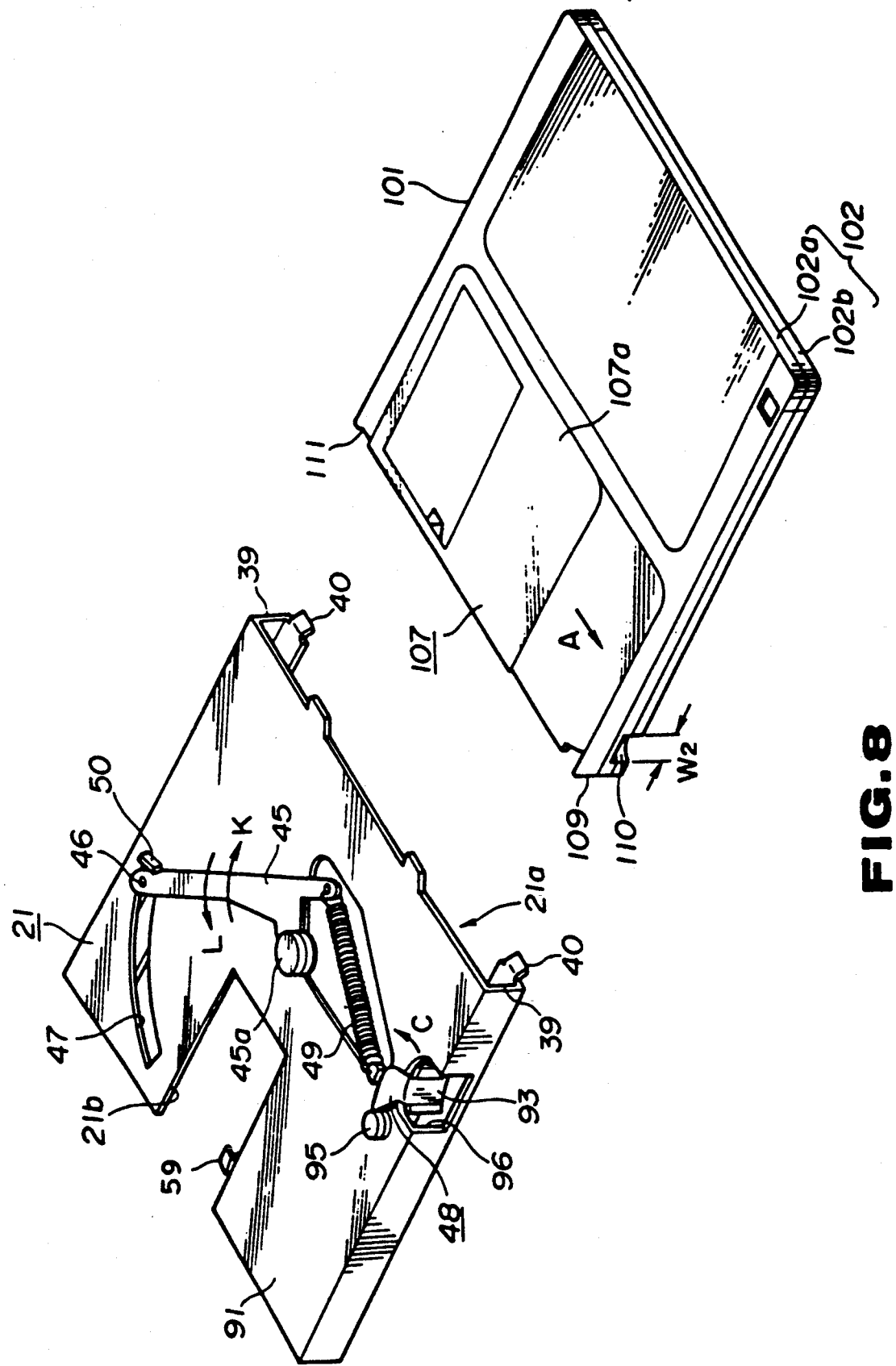
FIG. 8 is a perspective view showing a cartridge holder including a misinsertion detection mechanism in accordance with the present invention and a magneto-optical disc cartridge which is inserted into the cartridge holder.
Figure 9:
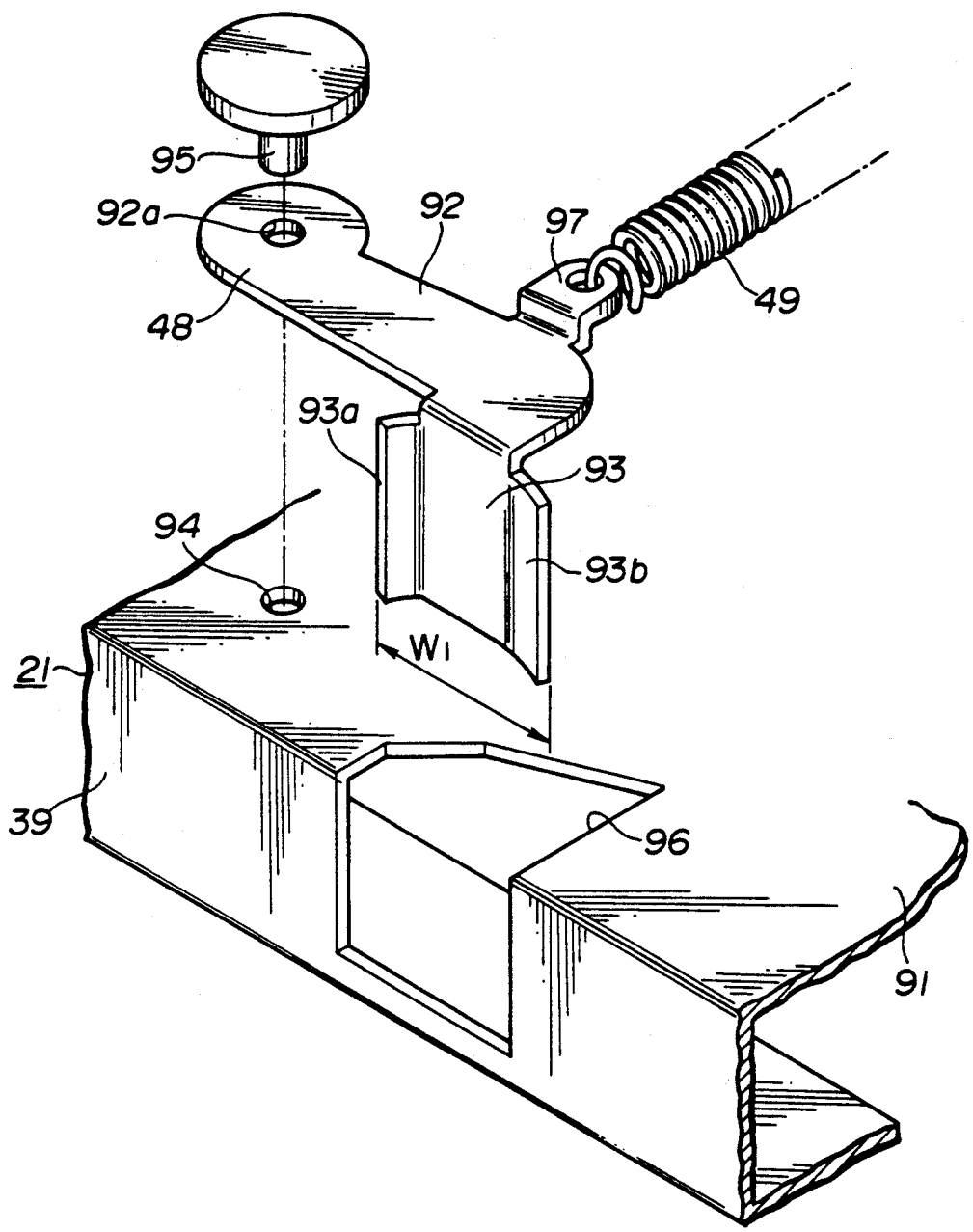
FIG. 9 is an enlarged perspective view showing a misinsertion detection lever forming the misinsertion detection mechanism of the present invention.

The misinsertion detection lever 48 is formed by bending a metal plate in a substantially L-shape as shown in FIGS. 8 and 9 and comprises a rotary arm 92 and a misinsertion detection piece 93 which is provided at one tip end thereof and is made normal to the rotary arm 92 by bending the metal plate to form piece 93 serving as a misinsertion detection portion. The misinsertion detection piece 93 is formed with inclined bent pieces 93a and 93b on opposite sides thereof. The entire width ($w_1$) of the misinsertion detection piece 93 is made larger than the opening width of the recess 109 formed on one side of the disc cartridge 101.

The misinsertion detection lever 48 is pivotally supported by a pivot shaft 95 which is inserted through a through hole 92a bored at the base end of the rotary arm 92 and is mounted on the cartridge holder 121 by being fitted into a hole 94 bored in the main face of the cartridge holder 121 as shown in FIG. 9. The lever 48 is thus rotatable around the shaft 95. At this time, the misinsertion detection piece 93 is located in the cartridge holder through a notch hole 96 bored from one of the slide guide walls 39 to the main face 91. The misinsertion detection lever 48 has a spring engagement piece 97 projecting on one side of the rotary arm 92 with which a second tension coil spring is engaged for biasing the shutter opening and closing lever 45 engaged at one end thereof so that the lever 48 is biased to move in a direction of an arrow C in FIG. 8. When the cartridge 101 is not fully inserted, the rotation position of the misinsertion detection lever 48 is restricted in such a manner that the misinsertion detection piece 93 is engaged with the notch 109 of the disc cartridge which is to be inserted into the cartridge holder 121. This restriction of the rotating and biasing position is achieved by the engagement of the misinsertion detection piece 93 with the edge of the main face 91 on the side of the notch 96.

The disc cartridge 101 is properly inserted into the cartridge holder 121 including the thus formed misinsertion detection lever 48 through the insertion opening at the front side of the cartridge holder 121 while the upper side of the opening 104 for the magnetic head faces the main face 91 of the cartridge holder 121, the front side of the disc cartridge 101 on which the shutter 107 is mounted is a leading end for insertion and the opposite sides of the main cartridge body 102 are engaged with and supported by respective slide guide walls 39 and 39. When the disc cartridge 101 is inserted into the cartridge holder 121 in such a manner, the misinsertion detection piece 93 is brought into an engagement with the notch 109 of the disc cartridge 101. When the disc cartridge 101 is further inserted into the cartridge holder 121 from this position, the misinsertion detection lever 48 having the misinsertion detection piece 93 engaged with the notch 109 is biased to rotate in a direction of an arrow C in FIG. 8 against the biasing force of the second tension coil spring 49 while the misinsertion piece 93 is biased by the notch 109 so that the misinsertion detection piece 93 will ride on one side of the main cartridge body 102 for enabling the disc cartridge 101 to be inserted to a proper loading position in the cartridge holder 121.

When the disc cartridge is further inserted into the inside of the cartridge holder 121 after the misinsertion detection lever 48 has been rotated as mentioned above, the shutter open and closing pin 46 will be brought into an engagement with the shutter opening and closing pin engagement recess 111 of the disc cartridge 101. The shutter opening and closing lever 45 is rotated in a direction of arrow L in FIG. 8 against a biasing force of the second tension coil spring 49 for releasing the shutter 107 of the disc cartridge 101. When the disc cartridge 101 has been inserted into a predetermined position in the cartridge holder 121, each of the openings 104, 105 and 106 of the cartridge 101 is completely opened.

If the disc cartridge 101 is misinserted from the rear side thereof opposite to the front side on which the shutter 107 is mounted, the misinsertion detection pin 93 would abut on and engaged with the rear side of the disc cartridge 101 since the cartridge 101 is not formed on the rear side thereof with the notch 109 which has been mentioned above. The misinsertion detection lever 48 is disabled from rotating for preventing the disc cartridge from being inserted into the cartridge holder 121. That is, the misinsertion detection lever 48 prohibits the disc cartridge 101 from being inserted into the cartridge holder 121.

Figure 1:
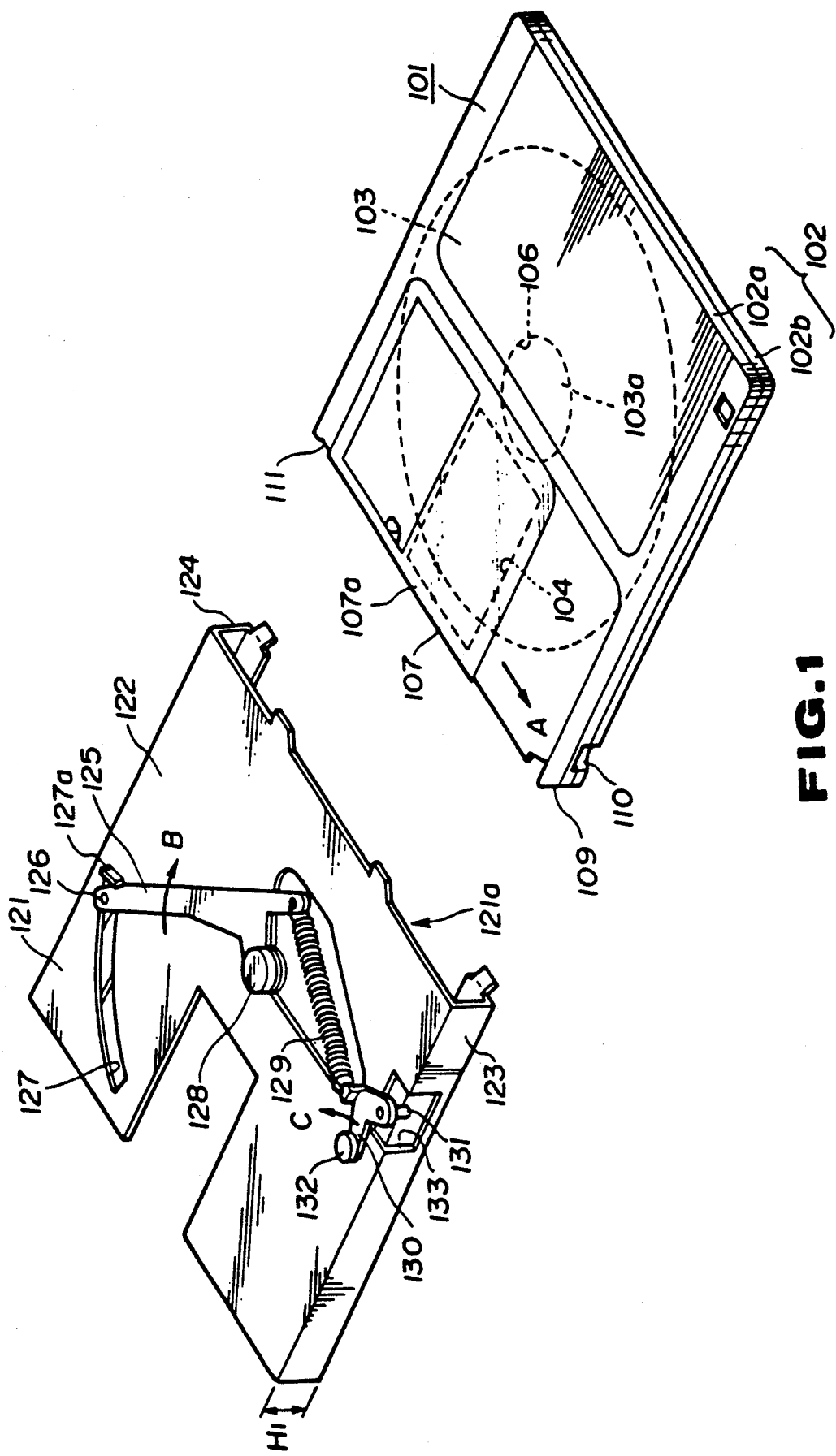
FIG. 1 is a perspective view of a conventional cartridge holder and magneto-optical disc cartridge which is inserted into the cartridge holder.
Figure 2:
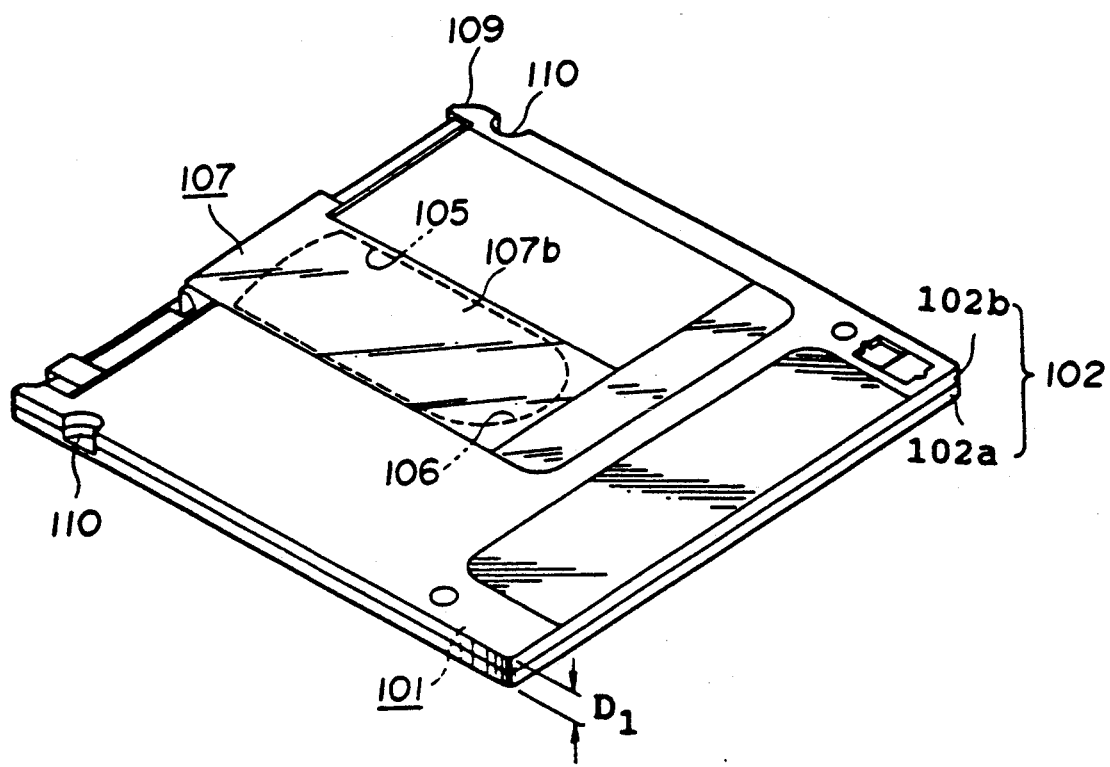
FIG. 2 is a perspective view showing the lower surface of the disc cartridge of FIG. 1.
Figure 3:
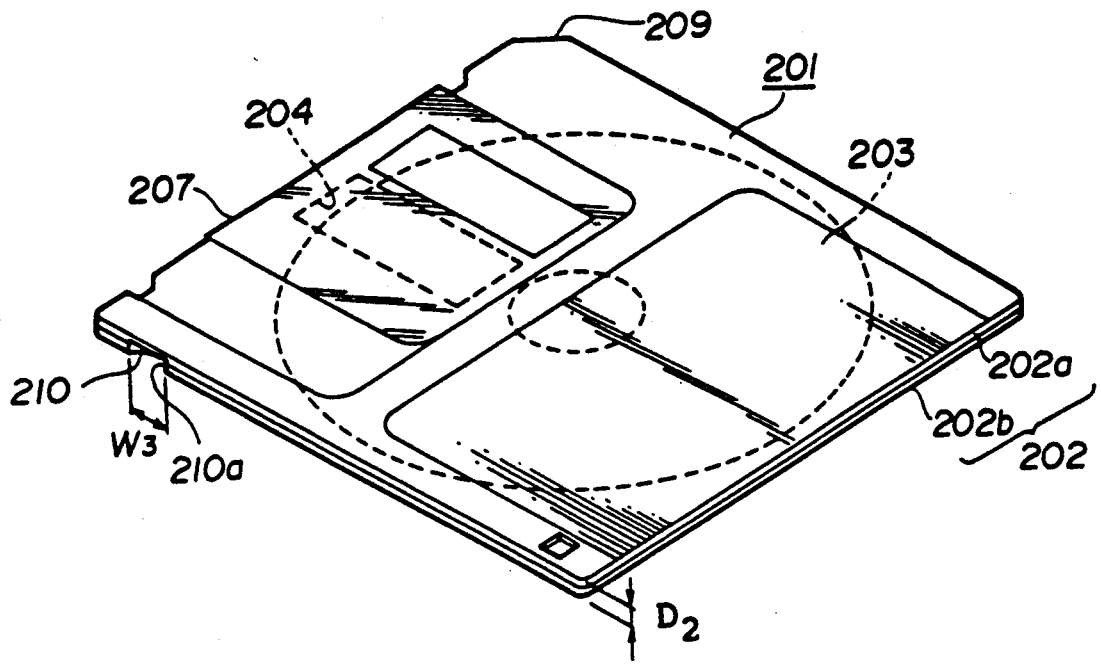
FIG. 3 is a perspective view showing the upper surface of a conventional magnetic disc cartridge.
Figure 4:
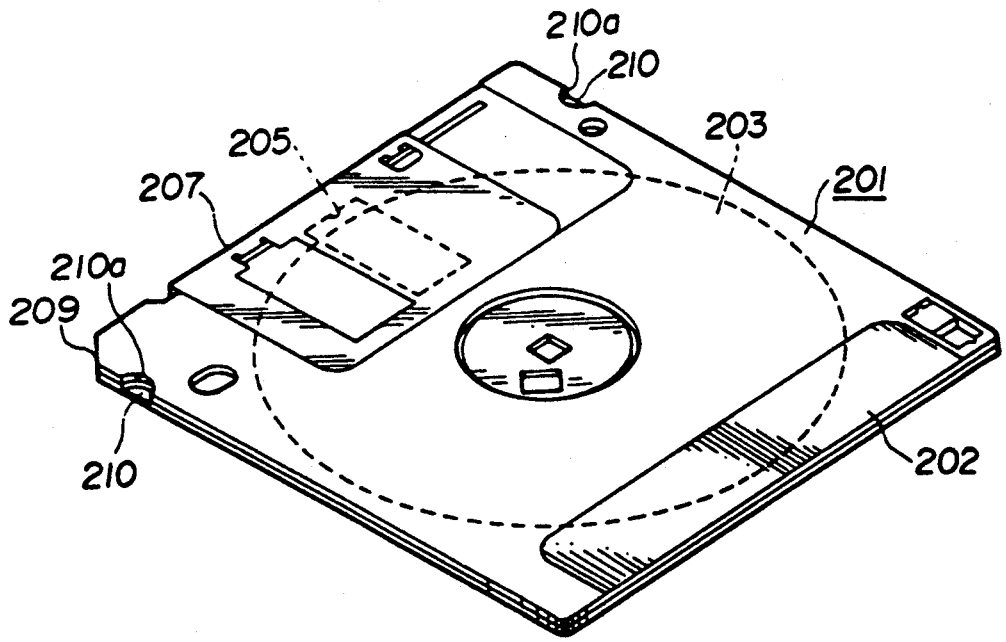
FIG. 4 is a perspective view showing the lower surface of the magnetic disc cartridge of FIG. 3.
Figure 5:
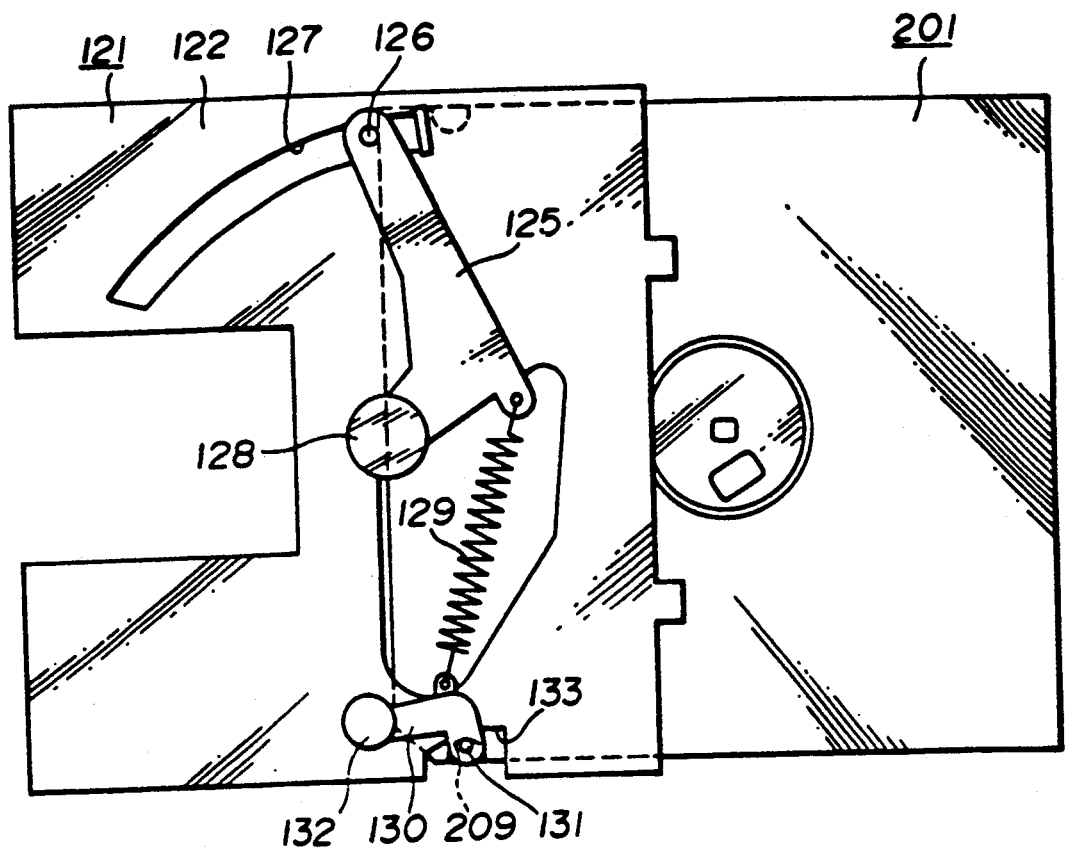
FIG. 5 is a plan view of the cartridge holder of FIG. 1, useful in explaining the conventional misinsertion detection mechanism into which the magnetic disc cartridge is inserted.
Figure 6:
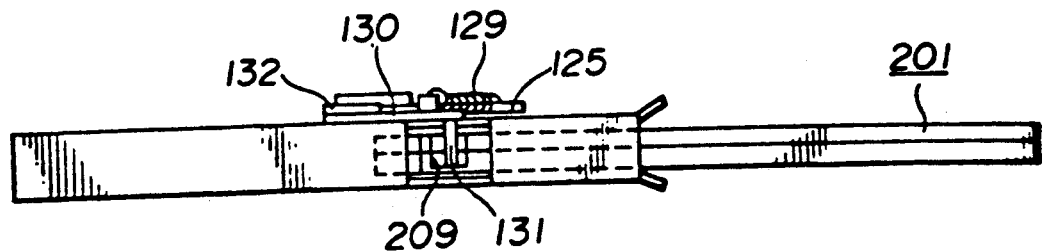
FIG. 6 is a side elevational view of the cartridge holder of FIG. 5.

If the above mentioned magnetic disc cartridge 201 of FIGS. 3 and 4 is accidentally inserted into the cartridge holder 121, the misinsertion detection lever 48 would be rotated against the biasing force of the second tension coil spring 49 while the misinsertion detection piece 93 is biased by the notch 209 of the magnetic disc cartridge 201 for enabling the magnetic disc cartridge 201 to be inserted.

Figure 10:
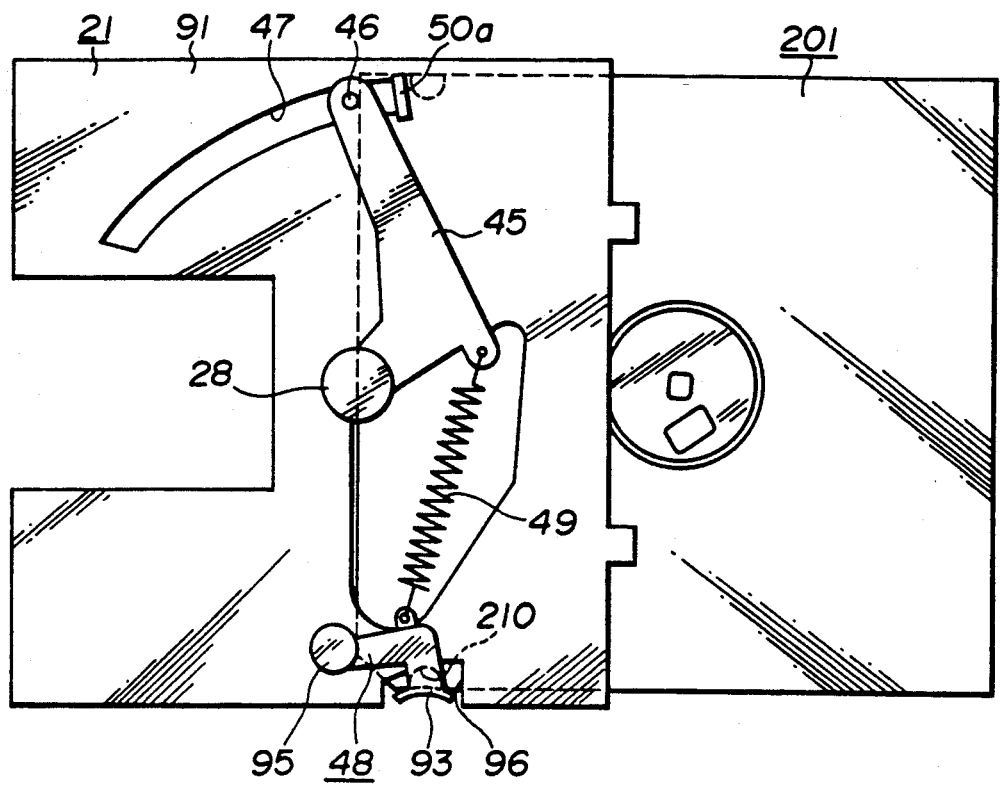
FIG. 10 is a plan view showing the cartridge holder of the present invention in which an improper magnetic disc cartridge is inserted.
Figure 11:
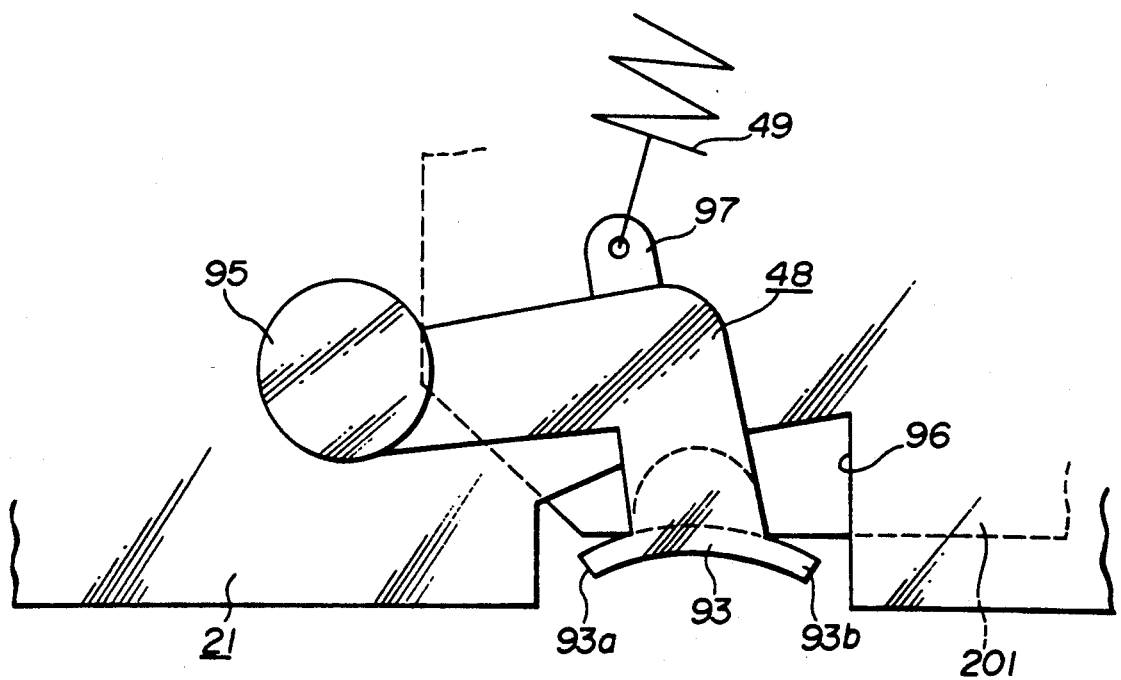
FIG. 11 is an enlarged plan view showing the misinsertion detection mechanism of the present invention.

However, since the width ($w_1$) of the misinsertion detection piece 93 is formed larger than the width of the opening edge 210a of the recess 210 in the present misinsertion preventing mechanism, the misinsertion detection piece 93 is prevented from moving into the recess 210 as shown in FIG. 11 although the magnetic disc cartridge 201 is inserted into the cartridge holder 121 as shown in FIG. 10. Even if the magnetic disc cartridge 201 is further inserted into the cartridge holder 121, the shutter opening and closing lever 45 would not be rotated since the release operation of the shutter 207 by the shutter opening and closing lever 45 is not performed and insertion operation of the magnetic disc cartridge 201 into a given insertion position would not be performed. The magnetic disc cartridge 201 can be easily removed from the cartridge holder 121 since the magnetic disc cartridge 201 is never anchored in the cartridge holder.

The above mentioned cartridge holder 121 is formed with a notch recess 21b which opens rearward so that the flying magnetic head 19 and the support arm 19 for supporting the flying magnetic head 19 can face the disc cartridge 101 inserted into the reception area 21a.

The magneto-optical disc recording apparatus comprises a lifter 52 which moves the flying magnetic head 19 to and from the magneto-optical disc 103. The lifter 52 is rotatably supported by a plunger supporting member 53 mounted on the rear side of the chassis 1. The lifter 52 has a base end supported by a support shaft 52a supported on the plunger supporting member 53 in a parallel relationship therewith and a tip end pointing toward the front side so that the tip end is positioned in the reception area 21a of the cartridge holder 121. That is, the lifter 52 is rotatable so that the tip end thereof can be moved to and from the chassis 1 in directions represented by arrows O and P in FIG. 7.

The lifter 52 has on the base end side a plunger engaging piece 54 projecting toward the chassis 1 which is engaged with a driving shaft 55a of a plunger 55 supported by the plunger supporting member 53. That is, the lifter 52 is rotated to cause the tip end thereof to approach to the chassis 1 via the plunger engaging piece 54 in a direction represented by an arrow O in FIG. 7 when the plunger 55 is actuated so that the driving shaft 55a is moved rearward in a direction represented by an arrow Q in FIG. 7.

The lifter 52 is formed with a spring engaging piece 56 and a position restriction piece 57 along the length thereof. The tip end of the spring engaging piece 56 is located on the side of the chassis 1 beyond the cartridge holder 121. A third tension coil spring 58 is tensioned between the tip end of the piece 56 and an engaging piece 60 provided at the rear end of the cartridge holder. The position restriction piece 57 is positioned on one side of a position restriction click 59 facing the chassis 1. The click 59 projects from the cartridge holder 121 toward the inner side of the notch recess 21b. That is, the lifter 52 is biased by the third tension coil spring 58 to rotate so that the tip end thereof will leave from the chassis 1 in a direction represented by an arrow P in FIG. 7 and is in a position where the position restriction piece 57 abuts on the position restriction click 59.

The lifter 52 is bent at the tip end to form a lift piece 61. The lift piece 61 is positioned on one side of the support arm 18 for supporting the flying magnetic head 19, facing the chassis 1. That is, the support arm 18 abuts on the lift piece 61 by the spring force of the flexer portion 18a and is supported by the lift piece 61.

The magneto-optical disc recording apparatus is provided with a shipping lock lever 62. The shipping lock lever 62 is supported on the length thereof by a support shaft 62a so that it is rotatable relative to the eject plate 22. The shipping lock lever 62 has one end facing the front side of the movable block 9 of the optical pick-up device 3 and the other end facing the rear side of the positioning pin 23. The shipping lock lever 62 is biased by a fourth tension coil spring 65 tensioned between a spring engaging portion 63 provided at one end thereof and a spring engaging piece 64 provided at the rear end of the eject plate 22 so that one end of the lever 62 is moved toward the rear side of the apparatus in a direction represented by an arrow R in FIG. 7.

The magneto-optical disc recording apparatus is further provided with a power eject mechanism 66. The power eject mechanism 66 comprises an eject motor 67 disposed on the chassis 1, first to third reduction gears 68, 69, 70 for transmitting the driving force from the eject motor 67 and an eject gear 71. The eject gear 71 has an eject pin 72 in an eccentric position which extends from the gear 72. The eject pin 72 is positioned on the front side of an eject operation piece 73 provided at the end of the eject plate 22. When the eject motor 67 is driven, the driving force is transmitted to the eject gear 71 via reduction gears 68, 69 and 70 for rotating the gear 71 so that eject pin 72 biases the eject operation piece 73 rearward to move the eject plate 22 in a rearward direction represented by an arrow F in FIG. 7. The power eject mechanism 66 is formed in such a manner.

In the thus formed disc recording apparatus, when the disc cartridge 101 is inserted from the front side into the reception area 21a of the cartridge holder 121, the shutter opening pin 46 engages the shutter opening and closing pin engaging recess 111. The shutter lever 45 is rotated against the biasing force of the first coil spring 49 as shown by an arrow L in FIG. 7 so that the shutter 107 is moved in a direction represented by an arrow A in FIG. 7 to open each of the openings 104, 105 and 106 of the main cartridge body.

Figure 13:
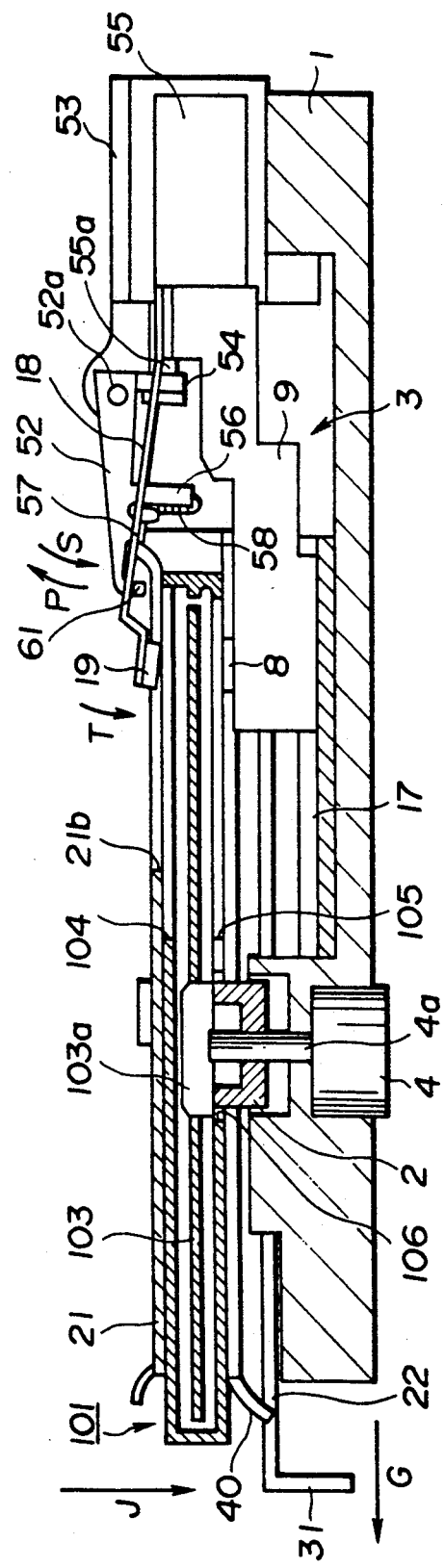
FIG. 13 is an enlarged longitudinal sectional view of the apparatus of FIG. 12, showing the external magnetic field generator in a position away from the magneto optical disc.

At this time, the lifter 52 is rotated in a direction so that the tip end thereof is moved away from the chassis 1 in a direction of an arrow P in FIG. 13 depending on the position of the cartridge holder 121 since the position restriction click 57 abuts on the position restriction click 59. Accordingly, the support arm 18 is supported on the lift piece 61 and is held in a position where the arm 18 is displaced to move away from the chassis 1 against the spring force of the flexer portion 18a. Therefore, the disc cartridge 101 is inserted into a space between the flying magnetic head 19 and the movable block 9 without abutting on the flying magnetic head 19.

Figure 16:
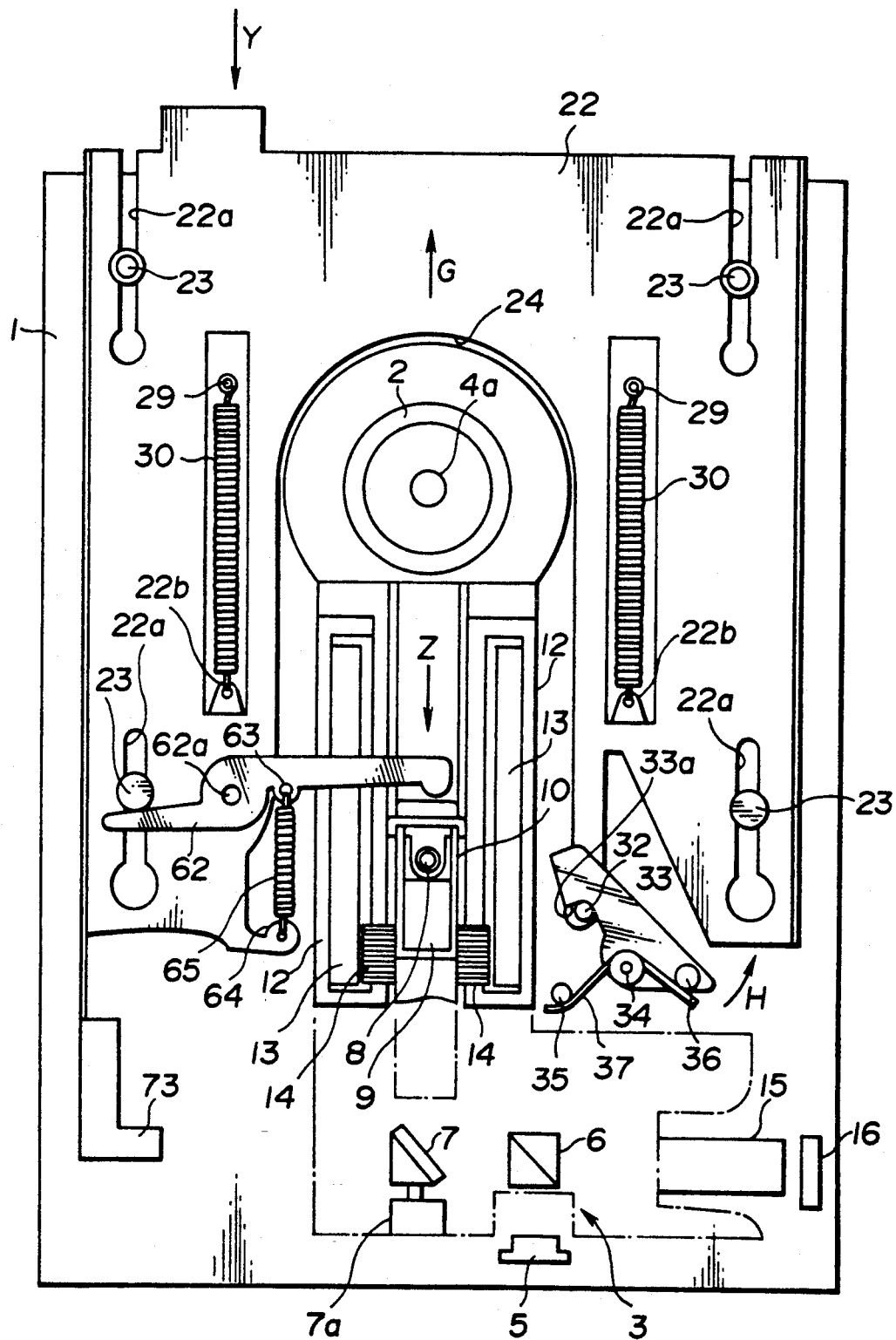
FIG. 16 is an enlarged plan view showing the structure of the apparatus of FIG. 15 in which the eject operation is performed.

At this time, the shipping lock lever 62 is biased to rotate so that one end thereof is moved in a rearward direction represented by an arrow Z in FIG. 16 by the fourth tension coil spring 65 as shown in FIG. 16 and one end thereof abuts on the movable block 9 of the optical pick-up device 3. That is, the movable block 9 is held at a rear side position via the shipping lock lever 62 by the biasing force of the fourth tension coil spring 65. At this time, the support arm 18 is held together with the movable block 9 on a rear side position, that is, an outer peripheral position of the disc 103 by the shipping lock lever 62. Accordingly, the flying magnetic head 19 can be moved in such a direction that it is sufficiently separated from the chassis 1 with a minimum displacement of the flexer portion 18a.

When the disc cartridge 101 is inserted into a position where the chucking hub 103a is opposite to the disc table 2, the cartridge 101 will urge the rotating pin 36 to rotate the lock lever 33 against the biasing force of the torsion coil spring 37 for releasing the engagement of the lock lever 33 with the lock pin 32. The eject plate 22 is then moved in a forward direction represented by an arrow G in FIG. 13 by the biasing force of the first tension coil spring 30. The cartridge holder 121 is moved so that the slide pins 41, 42, 43 and 44 move along the inclined cam faces 25a, 26a, 27a and 28a, respectively and the cartridge holder approaches the chassis 1 in a direction of an arrow J in FIG. 13. The disc cartridge 101 is then positioned and held by being sandwiched between the tip end of each positioning pin 23 and the cartridge holder 121.

At this time, the chucking hub 103a rests on the disc table 2 so that it is magnetically attracted to the disc table 2. Accordingly, the magneto-optical disc 103 will rotate by the rotation of the disc table 2.

Since the support shaft 62a of the shipping lock lever 62 follows the eject plate 22 to be moved forward at this time as shown in FIG. 15, the shipping lock lever 62 abuts on the positioning pin 23 at the other end thereof and is rotated against the biasing force of the fourth tension coil spring 65 so that one end of the lever 62 is moved in a forward direction represented by an arrow W of FIG. 15, that is, away from the movable block 9. Accordingly, the movable block 9 is movable in a radial direction of the disc 103 along the support rail 17.

Since the position restriction piece 57 abuts on the position restriction click 59, the lifter 52 is rotated to follow the cartridge holder 121 so that the tip end of the lifter 52 approaches the chassis 1 in a direction of an arrow S in FIG. 13. Accordingly, the support arm 18 is displaced by the spring force of the flexer portion 18a in a direction of an arrow T in FIG. 13 so that the flying magnetic head 19 approaches the disc 103. Although the flying magnetic head 19 approaches the magneto-optical disc 103, it is held in such a condition that it is not in contact with the disc 103.

Figure 14:
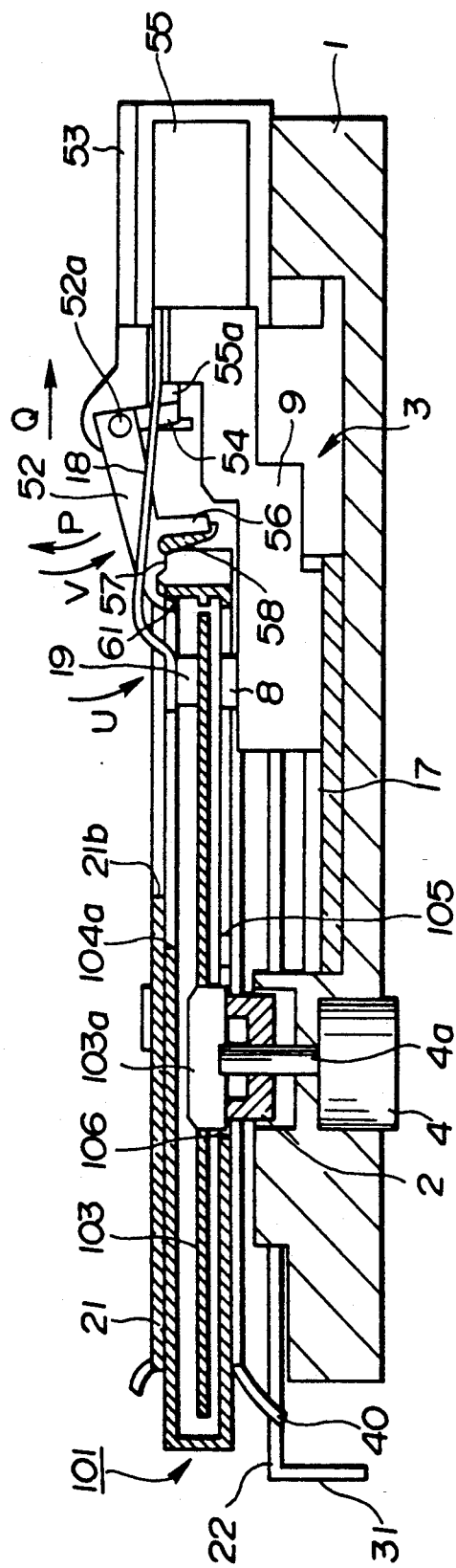
FIG. 14 is an enlarged longitudinal sectional view of the apparatus of FIG. 12, showing the external magnetic field generator in contact with the magneto-optical disc.

If the rotation of the disc 103 is commenced, the plunger 55 will be actuated as shown in FIG. 14 immediately after the commencement of the rotation of the disc 103 and the driving shaft 55a will be moved in a rearward direction represented by an arrow Q in FIG. 14. The lifter 52 is then rotated via the plunger engaging piece 54 in a direction of an arrow V in FIG. 14 against the biasing force of the third tension coil spring 58 so that the tip end thereof approaches the chassis 1. Accordingly, the support arm 18 is returned by the spring force of the flexer portion 18a in the direction of an arrow U in FIG. 14 so that the flying magnetic head 19 abuts on the disc 103. When the flying magnetic head 19 approaches the magneto-optical disc 103, the disc 103 has been already rotated. Accordingly, the above-mentioned air film gap has been formed to form a very narrow space between the disc 103 for holding the disc 103 in a close relationship with the head 19.

Since the flying magnetic head 19 is mounted on the projection 18c at this time, the flexer portion 18a will not contact the edge of the cartridge even if the flying magnetic head 19 approaches the disc 103.

In the disc recording apparatus, the plunger 55 is released before the rotation of the disc 103 is stopped. The lifter 52 is then rotated by the biasing force of the third tension coil spring 58 as shown in FIG. 13 so that the tip end thereof will move away from the chassis 1 to a position where the position restriction piece 57 abuts on the position restriction click 59. Accordingly, the flying magnetic head 19 is moved away from the disc 103 while the disc 103 is being rotated.

In order to eject the disc cartridge 101 from the disc recording apparatus, the manipulation button mount 31 is urged or the eject plate 22 is moved rearwardly by using the power eject mechanism 66. The cartridge holder 121 is then moved away from the chassis 1 while the guide pins 41, 42, 43 and 44 slide along the inclined cam faces 25a, 26a, 27a and 28a, respectively. At this time, the disc cartridge 101 is released from the tip end of each positioning pin 23 and the cartridge holder 121 and is ejected in a direction represented by an arrow G in FIG. 7 via the shutter opening and closing lever 45 and the lock lever 33 by the biasing force of the torsional coil spring 37 and the second coil spring 49. The ejection of the disc cartridge 101 causes the shutter opening and closing lever 45 to be rotated by the biasing force of the second tension coil spring 49 so that the shutter member 107 is moved to close each of the openings 104, 105 and 106.

At this time, the shipping lock lever 62 is rotated by the fourth tension coil spring 65 as shown in FIG. 16 so that one end thereof is moved in a rearward direction represented by an arrow Z in FIG. 16. Accordingly, the movable block 9 of the optical pick-up device 3 is moved to a rear side position via the shipping lock lever 62 by the biasing force of the fourth tension coil spring 65 and is held in this position. Since the support arm 18 is held on the outer peripheral position of the disc 103 by the shipping lock lever 62, the support arm 18 enables the flying magnetic head 19 to move sufficiently away from the disc 103 with minimum displacement of the flexer portion 18a.

The lock lever 33 is rotated by the biasing force of the torsional coil spring 37 in association with the ejection of the cartridge 101 so that the engagement 33a is brought into an engagement with the lock pin 32 for locking the eject plate 22 in an eject position.

Figure 18:
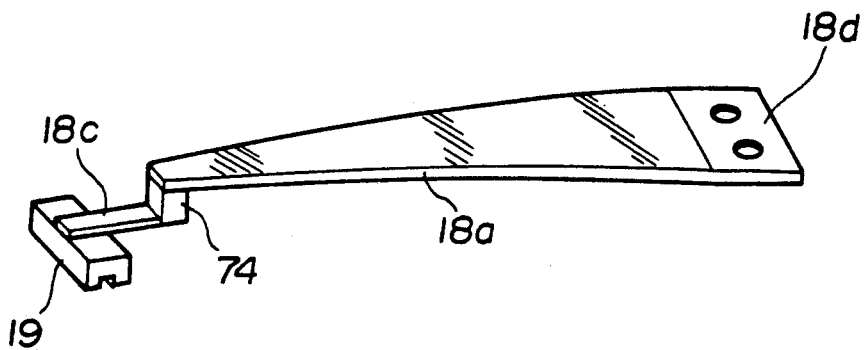
FIG. 18 is an enlarged perspective view showing another embodiment of the flying magnetic head and the support arm of FIG. 17.

The support arm 18 which forms the disc recording apparatus is not limited to the above mentioned embodiment and need not be formed with the projection 18c at the tip end of the flexer portion 18a. The gimbal portion 18b may be replaced with a gimbal support member 74 forming a projection mounted on the tip end of the flexer 18a, as shown in FIG. 18, and further the projection 18c may be mounted on the tip end of the gimbal support member 74.

In this case, the flying magnetic head 19 can move into the main cartridge body 102 to closely access to the disc 103 without contact between the flexer portion 18a and the edge of the disc cartridge 101.

What is claimed is:

1. A recording apparatus for a magneto-optical disc comprising:
   a chassis of the recording apparatus;
   a cartridge holder defining a cartridge holding portion into which is loaded a disc cartridge containing a magneto-optical disc and being movable toward and away from said chassis of the recording apparatus;
   an optical head mounted on a movable block for movement along a radial direction relative to a disc loaded into said cartridge holder;
   an external magnetic field generator including a magnetic head mounted at one end of a flexible support arm, the other end of said flexible support arm being attached to said movable block for movement with said optical head;
   a lifter mechanism in contact with said flexible support arm for moving said magnetic head toward and away from a disc loaded into said cartridge holder;
   control means operably connected to said lifter mechanism and being mounted on said chassis for controlling the operation of said lifter mechanism in response to the position of the disc cartridge in said cartridge holder, so that said magnetic head is moved toward and away from a disc loaded into said cartridge holder in response to movement of said cartridge holder;
   lock means arranged on said chassis for controlling movement of said movable block having said optical head and said magnetic field generator mounted thereon during a cartridge loading operation of said cartridge holder; and
   misinsertion detection means, said misinsertion detection means including a misinsertion detection portion extending into one side of said cartridge holding portion and being movable in a direction away from said cartridge holding portion of said cartridge holder by engagement with a notch formed on a corner of said disc cartridge when said disc cartridge is inserted into said cartridge holder and for engaging said disc cartridge when said disc cartridge is misinserted into said cartridge holder and preventing said misinserted disc cartridge from being further inserted into said cartridge holder, said misinsertion detection portion of said misinsertion detection means having a width larger than the width of a recess formed on a side of the disc cartridge on which said notch is formed.

2. A disc cartridge misinsertion preventing mechanism comprising;
   a cartridge holder defining a cartridge holding portion into which a disc cartridge is inserted and held, said disc cartridge having a notch formed at a corner on one side thereof for predetermining an insertion direction and having a recess formed on said one side thereof near the notch; and
   misinsertion detection means having a misinsertion detection portion movable by engagement with said notch of the disc cartridge in a direction away from said cartridge holding portion of said cartridge holder when said disc cartridge is properly inserted into said cartridge holder, and engageable with said disc cartridge when said disc cartridge is misinserted into said cartridge holder for preventing said disc cartridge from being further inserted into said cartridge holder, said misinsertion detection portion of said misinsertion means having a width larger than a width of the recess formed in said disc cartridge, so that said misinsertion detection portion does not enter said recess.

3. A disc cartridge misinsertion preventing mechanism according to claim 2, wherein said cartridge holder includes shutter opening and closing means rotatably mounted on said cartridge holder for opening and closing a shutter of the disc cartridge, said shutter opening and closing means including a spring member having one end thereof mounted on said shutter opening and closing means and another end thereof mounted on said misinsertion detection means.

4. A disc cartridge misinsertion preventing mechanism according to claim 3, wherein said misinsertion detection portion of said misinsertion detection means projects into said cartridge holder.

5. A recording apparatus for a magneto-optical disc comprising:
- a chassis of the recording apparatus;
- a cartridge holder defining a cartridge holding portion into which is loaded a disc cartridge containing a magneto-optical disc and being movable toward and away from said chassis of the recording apparatus;
- an optical head mounted on a movable block for movement along a radial direction relative to a disc loaded into said cartridge holder;
- an external magnetic field generator including a magnetic head mounted at one end of a flexible support arm, the other end of said flexible support arm being attached to said movable block for movement with said optical head;
- a lifter mechanism in contact with said flexible support arm for moving said magnetic head toward and away from a disc loaded into said cartridge holder;
- control means operably connected to said lifter mechanism and being mounted on said chassis for controlling the operation of said lifter mechanism in response to the position of the disc cartridge in said cartridge holder, so that said magnetic head is moved toward and away from a disc loaded into said cartridge holder in response to movement of said cartridge holder, said control means including a lift bar extending under said flexible support arm, so that said flexible support arm rests upon said lift bar in a lowered position and in a raised position of said external magnetic field generator and a plunger mechanism having a plunger support mounted on said chassis and a movable plunger, said lift bar being pivotally attached to said plunger support so that in an extended position of said movable plunger said lift bar is raised and in a drawn-in position of said movable plunger said lift bar is lowered; and
- lock means arranged on said chassis for controlling movement of said movable block having said optical head and said magnetic field generator mounted thereon during a cartridge loading operation of said cartridge holder.

6. A recording apparatus for a magneto-optical disc comprising:
- a chassis of the recording apparatus;
- an optical head mounted on a movable block for movement along a radial direction relative to a magneto-optical disc in the recording apparatus;
- a loading mechanism including a cartridge holder defining a cartridge holder portion for loading and unloading a cartridge containing a magneto-optical disc into a recording portion of said recording apparatus;
- an external magnetic field generator including a magnetic head mounted at one end of a flexible support, the other end of said flexible support arm being attached to said movable block for movement with said optical head radially relative to a magneto-optical disc loaded into said recording portion;
- lifting means being in contact with said flexible support arm for lowering and raising said external magnetic field generator toward and away from the magneto-optical disc loaded in said recording portion;
- control means attached to said lifting means and mounted on said chassis for controlling the operation of said lifting means in response to movement of said cartridge holder, said control means including a lift bar extending under said flexible support arm, so that said flexible support arm rests upon said lift bar in a lowered position and in a raised position of said external magnetic field generator, a plunger mechanism having a plunger support mounted on said chassis and a movable plunger, said lift bar being pivotally attached to said plunger support so that in an extended position of said movable plunger said lift bar is raised and in a drawn-in position of said movable plunger said lift bar is lowered; and
- locking means on said chassis for controlling movement of said movable block having said optical head and magnetic field generator mounted thereon during a cartridge loading operation of said loading mechanism.

7. A magneto-optical disc recording apparatus according to claim 6, wherein said flexible support arm includes a projection extending from one end of said support arm, and said magnetic head device is mounted on said projection, so that said magnetic head device faces the magneto-optical disc.

8. A recording apparatus for a magneto-optical disc comprising:
- a chassis of the recording apparatus;
- an optical head mounted on a movable block for movement along a radial direction relative to a magneto-optical disc in the recording apparatus;
- a loading mechanism including a cartridge holder defining a cartridge holder portion for loading and unloading a cartridge containing a magneto-optical disc into a recording portion of said recording apparatus;
- an external magnetic field generator including a magnetic head mounted at one end of a flexible support, the other end of said flexible support arm being attached to said movable block for movement with said optical head radially relative to a magneto-optical disc loaded into said recording portion;
- lifting means being in contact with said flexible support arm for lowering and raising said external magnetic field generator toward and away from the magneto-optical disc loaded in said recording portion;
- control means attached to said lifting means and mounted on said chassis for controlling the operation of said lifting means in response to movement of said cartridge holder;
- locking means on said chassis for controlling movement of said movable block having said optical head and magnetic field generator mounted thereon during a cartridge loading operation of said loading mechanism; and misinsertion detection means including a misinsertion detecting portion extending into one side of said cartridge holder portion and being movable in a direction out of said cartridge holder portion upon engagement with a notch formed on a corner of said cartridge when said cartridge is properly inserted into said cartridge holder and for engaging said cartridge when said cartridge is misinserted into said cartridge holder and preventing the misinserted cartridge from being further inserted into said cartridge holder, said misinsertion detection portion having a width greater than a width of a recess formed in a side of said cartridge on which said notch is formed.

* * * * *

UNITED STATES PATENT AND TRADEMARK OFFICE
CERTIFICATE OF CORRECTION

PATENT NO. : 5,224,079
DATED : June 29, 1993
INVENTOR(S) : Hideki Inoue

It is certified that error appears in the above-indentified patent and that said Letters Patent is hereby corrected as shown below:

Title page, col. 2, under Foreign Patent Documents, insert Attorney, Agent or Firm-- Lewis H. Eslinger; Jay H. Maioli--.

Col. 1, line 32, after "and" first occurrence, insert --irradiating--
line 64, change "on" to --an--
Col. 3, line 19, change "12.1" to --121--
line 53, delete "108"
Col. 4, line 21, change "based" to --base--
line 28, change "arrow c" to --arrow C--
Col. 5, line 9, delete "108"
Col. 11, line 44, after "32" insert --,--
line 61, change "12" to --121--
Col. 17, line 49, after "engagement" insert --portion--

Signed and Sealed this

Thirtieth Day of August, 1994

Attest:

BRUCE LEHMAN

*Attesting Officer*  *Commissioner of Patents and Trademarks*